US009438064B2

United States Patent
Keeling et al.

(10) Patent No.: US 9,438,064 B2
(45) Date of Patent: Sep. 6, 2016

(54) SYSTEM AND METHOD FOR ALIGNMENT AND COMPATIBILITY DETECTION FOR A WIRELESS POWER TRANSFER SYSTEM

(71) Applicant: QUALCOMM Incorporated, San Diego, CA (US)

(72) Inventors: Nicholas Athol Keeling, Auckland (NZ); Michael Le Gallais Kissin, Auckland (NZ); Chang-Yu Huang, Auckland (NZ); Jonathan Beaver, Auckland (NZ); Mickel Bipin Budhia, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 14/218,246

(22) Filed: Mar. 18, 2014

(65) Prior Publication Data

US 2015/0061578 A1 Mar. 5, 2015

Related U.S. Application Data

(60) Provisional application No. 61/873,271, filed on Sep. 3, 2013, provisional application No. 61/872,526, filed on Aug. 30, 2013.

(51) Int. Cl.
*H02J 7/02* (2016.01)
*B60L 11/18* (2006.01)
(Continued)

(52) U.S. Cl.
CPC .............. *H02J 7/025* (2013.01); *B60L 11/182* (2013.01); *H02J 5/005* (2013.01); *H02J 7/0004* (2013.01);
(Continued)

(58) Field of Classification Search
CPC ...................................................... H02J 7/025
USPC ...................................................... 320/108
See application file for complete search history.

(56) References Cited

U.S. PATENT DOCUMENTS

2012/0235506 A1 9/2012 Kallal et al.
2012/0235509 A1 9/2012 Ueno et al.
(Continued)

FOREIGN PATENT DOCUMENTS

DE 2434890 B1 11/1975
EP 2773019 A1 9/2014
(Continued)

OTHER PUBLICATIONS

International Search Report and Written Opinion—PCT/US2014/051141—ISA/EPO—Dec. 12, 2014.

*Primary Examiner* — Thuan Do
(74) *Attorney, Agent, or Firm* — Knobbe, Martens, Olson & Bear LLP

(57) ABSTRACT

Systems, methods, and apparatuses for receiving charging power wirelessly are described herein. One implementation may include an apparatus for receiving charging power wirelessly from a charging transmitter having a transmit coil. The apparatus comprises a receiver communication circuit, coupled to a receive coil and to a load. The receiver communication circuit is configured to receive information associated with at least one characteristic of the charging transmitter. The apparatus further comprises a sensor circuit configured to measure a value of a short circuit current or an open circuit voltage associated with the receive coil. The apparatus further comprises a controller configured to compare the value of the short circuit current or the open circuit voltage to a threshold charging parameter set at a level that provides charging power sufficient to charge the load. The controller may be further configured to initiate receiving the charging power from the charging transmitter when the short circuit current or the open circuit voltage associated with the receive coil is greater than or equal to the threshold charging parameter.

30 Claims, 13 Drawing Sheets

(51) Int. Cl.
  *H02J 17/00* (2006.01)
  *H02J 5/00* (2016.01)
  *H02J 7/00* (2006.01)
  *H04B 5/00* (2006.01)

(52) U.S. Cl.
  CPC ............ *H02J 17/00* (2013.01); *H04B 5/0037* (2013.01); *H04B 5/0081* (2013.01); *H02J 7/0052* (2013.01); *H04B 5/0031* (2013.01); *Y02T 10/7005* (2013.01); *Y02T 10/7072* (2013.01); *Y02T 10/7094* (2013.01); *Y02T 90/122* (2013.01); *Y02T 90/14* (2013.01); *Y02T 90/16* (2013.01)

(56) References Cited

U.S. PATENT DOCUMENTS

| | | |
|---|---|---|
| 2013/0140900 A1 | 6/2013 | Yu et al. |
| 2013/0181539 A1 | 7/2013 | Muratov et al. |
| 2013/0249299 A1 | 9/2013 | Shijo et al. |
| 2014/0015327 A1* | 1/2014 | Keeling ................ B60L 11/182 307/104 |

FOREIGN PATENT DOCUMENTS

| | | |
|---|---|---|
| NZ | 274939 A | 6/1997 |
| WO | WO-2013061440 | 5/2013 |

* cited by examiner

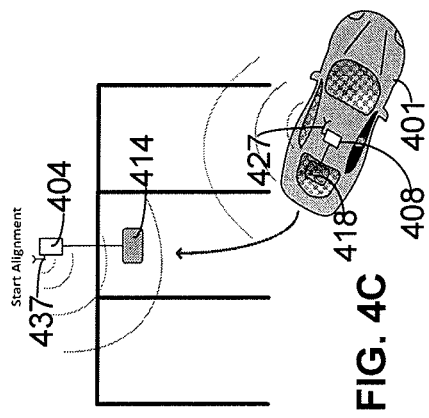
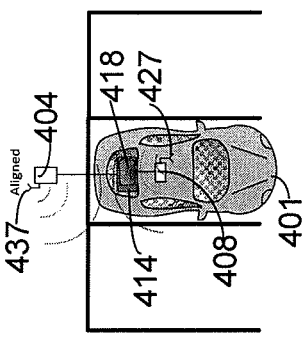
FIG. 4C
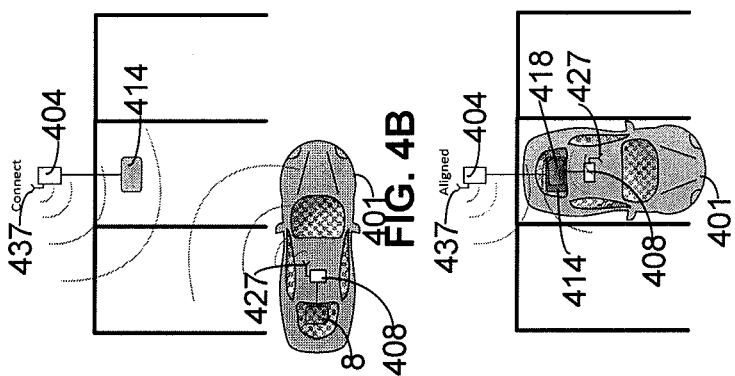
FIG. 4B
FIG. 4E
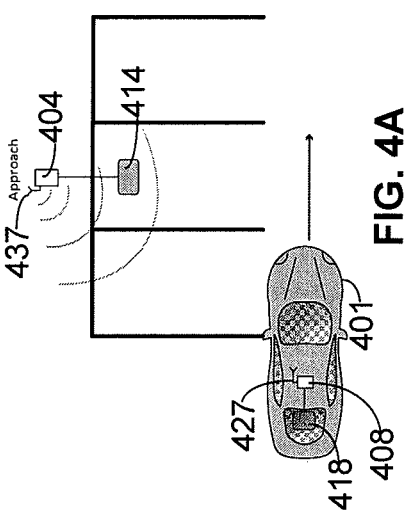
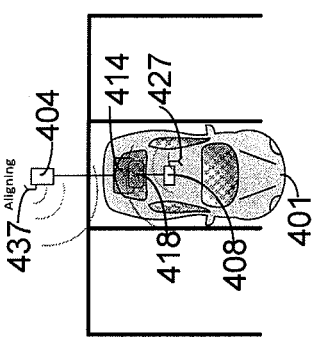
FIG. 4A
FIG. 4D

SECONDARY CURRENT CONTROLLER

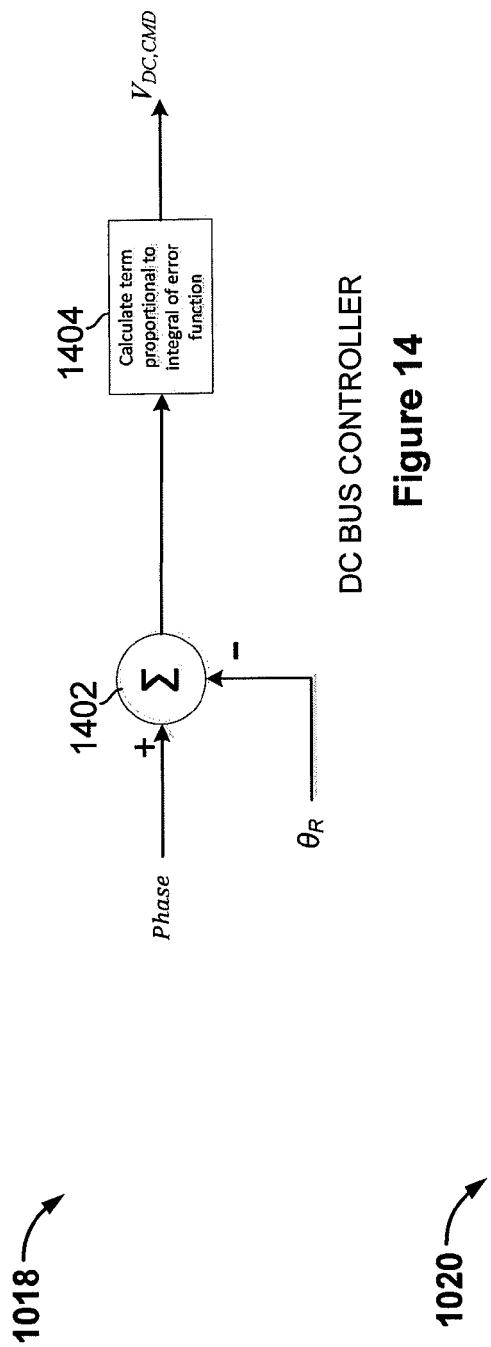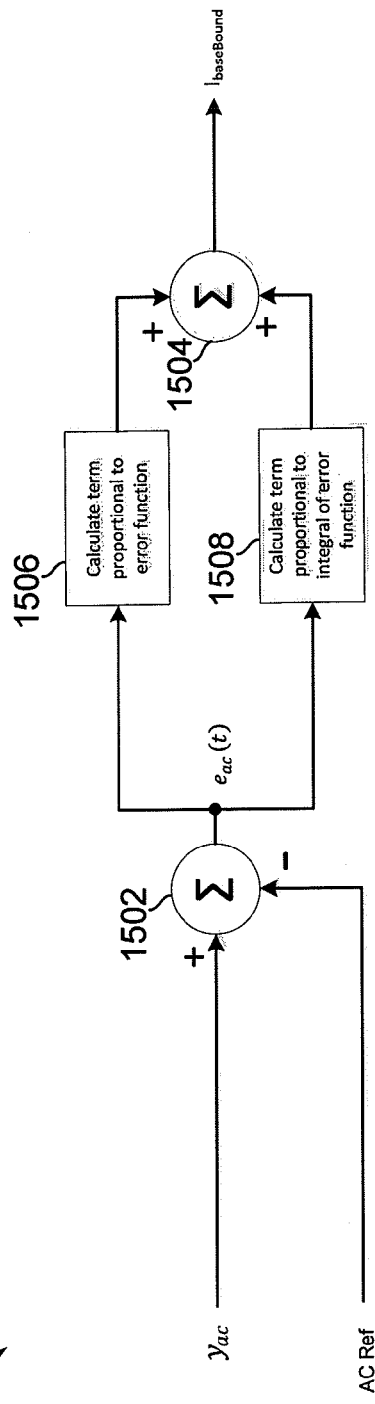
Figure 14
DC BUS CONTROLLER
Figure 15
CURRENT LIMITER

SYSTEM AND METHOD FOR ALIGNMENT AND COMPATIBILITY DETECTION FOR A WIRELESS POWER TRANSFER SYSTEM

CROSS REFERENCE TO RELATED APPLICATIONS

This application claims priority to: 1) Provisional Application No. 61/872,526 entitled "ALIGNMENT AND CONTROL SCHEME FOR INTEROPERABILITY" filed Aug. 30, 2013, and 2) Provisional Application No. 61/873,271 entitled "SYSTEM AND METHOD FOR ALIGNMENT AND COMPATIBILITY DETECTION FOR A WIRELESS POWER TRANSFER SYSTEM" filed Sep. 3, 2013. The disclosure of each is hereby expressly incorporated in its entirety by reference herein.

TECHNICAL FIELD

The described technology generally relates to wireless power. More specifically, the disclosure is directed to devices, systems, and methods related to alignment and compatibility detection for wireless power transfer systems with remote systems such as vehicles including batteries.

BACKGROUND

Wireless power transfer systems may differ in many aspects including circuit topologies, magnetics layout and power transmission capabilities or requirements. Further, the amount of power that may be transferred from a particular power transfer system to a vehicle may depend on the physical alignment between the system and the electric vehicle. Thus, there is a need to assess the level of compatibility between a particular wireless power transfer system and the electric vehicle.

SUMMARY

An apparatus for receiving charging power wirelessly from a charging transmitter having a transmit coil is provided. The apparatus comprises a receiver communication circuit coupled to a receive coil and to a load. The receiver communication circuit is configured to receive information associated with at least one characteristic of the charging transmitter. The apparatus further comprises a sensor circuit configured to measure a value of a short circuit current or an open circuit voltage associated with the receive coil. The apparatus further comprises a controller configured to compare the value of the short circuit current or the open circuit voltage to a threshold charging parameter set at a level that provides charging power sufficient to charge the load. The controller is further configured to initiate receiving the charging power from the charging transmitter when the short circuit current or the open circuit voltage associated with the receive coil is greater than or equal to the threshold charging parameter.

A method of receiving charging power wirelessly is provided. The method comprises receiving information associated with at least one characteristic of a charging transmitter. The method further comprises measuring a value of a short circuit current or an open circuit voltage associated with a receive coil. The method further comprises comparing the value of the short circuit current or the open circuit voltage to a threshold charging parameter, the threshold set at a level that provides charging power sufficient to charge a load. The method further comprises initiating receiving the charging power from the charging transmitter when the short circuit current or the open circuit voltage associated with the receive coil is greater than or equal to the threshold charging parameter.

An apparatus for receiving charging power wirelessly is provided. The apparatus comprises means for receiving information associated with at least one characteristic of a charging transmitter. The means for receiving the information is operatively connected to a load. The apparatus further comprises means for measuring a value of a short circuit current or an open circuit voltage associated with the receiving means. The apparatus further comprises means for comparing the value of the short circuit current or the open circuit voltage to a threshold charging parameter. The threshold is set at a level that provides charging power sufficient to charge the load. The apparatus further comprises means for initiating receiving the charging power from the charging transmitter when the short circuit current or the open circuit voltage associated with the receiving means is greater than or equal to the threshold charging parameter.

An apparatus for transmitting charging power wirelessly to a receive coil of a receiver is provided. The apparatus comprises a transmit circuit coupled to a transmit coil. The apparatus further comprises a sensor circuit coupled to the transmit circuit. The sensor circuit is configured to measure a value of at least one characteristic of the transmit circuit. The apparatus further comprises a communication circuit configured to transmit an indication of the value of the at least one characteristic of the transmit circuit to the receiver. The indication causes the receiver to determine a threshold charging parameter based on the indication. The indication causes the receiver to initiate receiving the charging power when a short circuit current or an open circuit voltage associated with the receive coil is greater than or equal to the threshold charging parameter.

BRIEF DESCRIPTION OF THE DRAWINGS

FIGS. 4A-4E are depictions of an alignment operation of electric vehicle and a wireless power transfer system, in accordance with an exemplary implementation.

FIG. 14 shows a state diagram of a DC bus controller of the power transmitter system of FIG. 10 in accordance with an exemplary implementation.

FIG. 15 shows a state diagram of a current limiter of the power transmitter system of FIG. 10 in accordance with an exemplary implementation.

Figure 1:
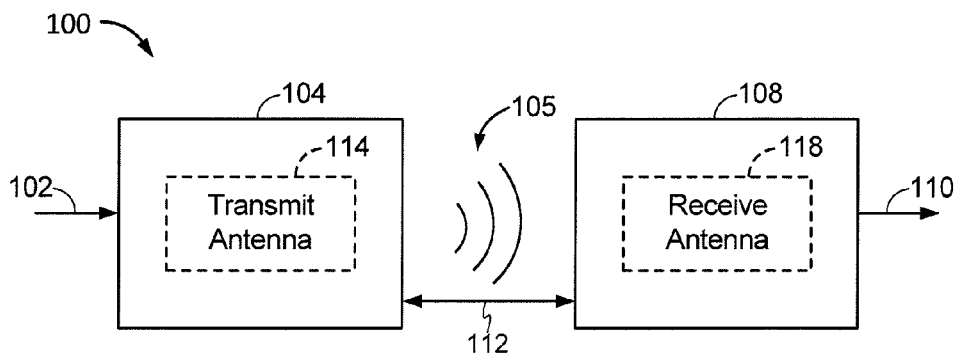
FIG. 1 is a functional block diagram of a wireless power transfer system, in accordance with one exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

FIG. 1 is a functional block diagram of a wireless power transfer system 100, in accordance with one exemplary implementation. An input power 102 may be provided to a transmitter 104 from a power source (not shown) to generate a wireless (e.g., magnetic or electromagnetic) field 105 for performing energy transfer. A receiver 108 may couple to the wireless field 105 and generate an output power 110 for storing or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2:
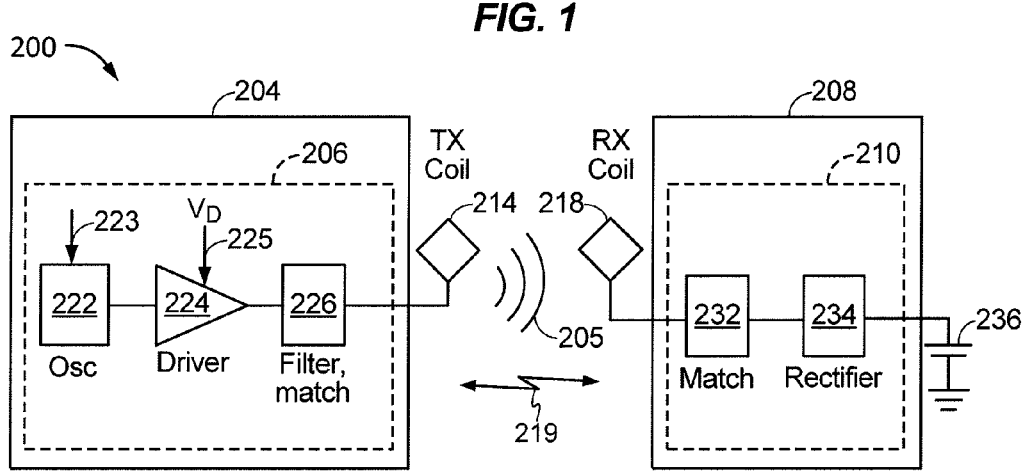
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal ($V_D$) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of an electric vehicle, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
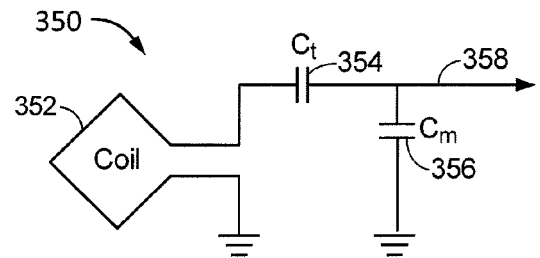
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2 including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 may be more powerful.

As stated, efficient transfer of energy between the transmitter 104/204 and the receiver 108/208 may occur during matched or nearly matched resonance between the transmitter 104/204 and the receiver 108/208. However, even when resonance between the transmitter 104/204 and receiver 108/208 are not matched, energy may be transferred, although the efficiency may be affected. For example, the efficiency may be less when resonance is not matched. Transfer of energy occurs by coupling energy from the wireless field 105/205 of the transmit coil 114/214 to the receive coil 118/218, residing in the vicinity of the wireless field 105/205, rather than propagating the energy from the transmit coil 114/214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

Referring to FIGS. 1 and 2, the transmitter 104/204 may output a time varying magnetic (or electromagnetic) field with a frequency corresponding to the resonant frequency of the transmit coil 114/214. When the receiver 108/208 is within the wireless field 105/205, the time varying magnetic (or electromagnetic) field may induce a current in the receive coil 118/218. As described above, if the receive coil 118/218 is configured to resonate at the frequency of the transmit coil 114/214, energy may be efficiently transferred. The AC signal induced in the receive coil 118/218 may be rectified as described above to produce a DC signal that may be provided to charge or to power a load.

FIGS. 4A, 4B, 4C, 4D and 4E are depictions of an alignment operation between an electric vehicle and a wireless power transfer system, in accordance with an exemplary implementation of the invention. FIG. 4A shows an electric vehicle 401 including a wireless power transfer and communication receiver 408 electrically connected to a receive antenna or coil 418 and a communications antenna 427. FIG. 4A also shows a wireless power transfer and communication transmitter 404 electrically connected to a transmit antenna or coil 414 and a communications antenna 437. The communications antenna 427 may be different from the receive coil 418. The communications antenna 437 may be different from the transmit coil 414. The communications antennas 427 and 437 may be configured to facilitate communication between the receiver 408 and the transmitter 404, respectively, as the vehicle 401 approaches. FIG. 4B shows the receiver 408 onboard the vehicle 401 establishing communication with the transmitter 404. In FIG. 4C, an alignment procedure may begin as the vehicle 401 moves towards the transmit coil 414. The communications link provides visual feedback, auditory feedback, or combinations thereof to a driver of the vehicle 401. The driver may use this feedback to determine when the vehicle 401 is properly positioned for wireless power transfer. In FIG. 4D, the alignment procedure continues as the vehicle 401 finalizes alignment by positioning the vehicle 401 such that the receive coil 418 mounted to the vehicle 410 is substantially aligned with the transmit coil 414. Finally, FIG. 4D shows the vehicle 401 positioned such that the receive coil 418 is substantially aligned with the transmit coil 414 of the transmitter 404.

Figure 5:
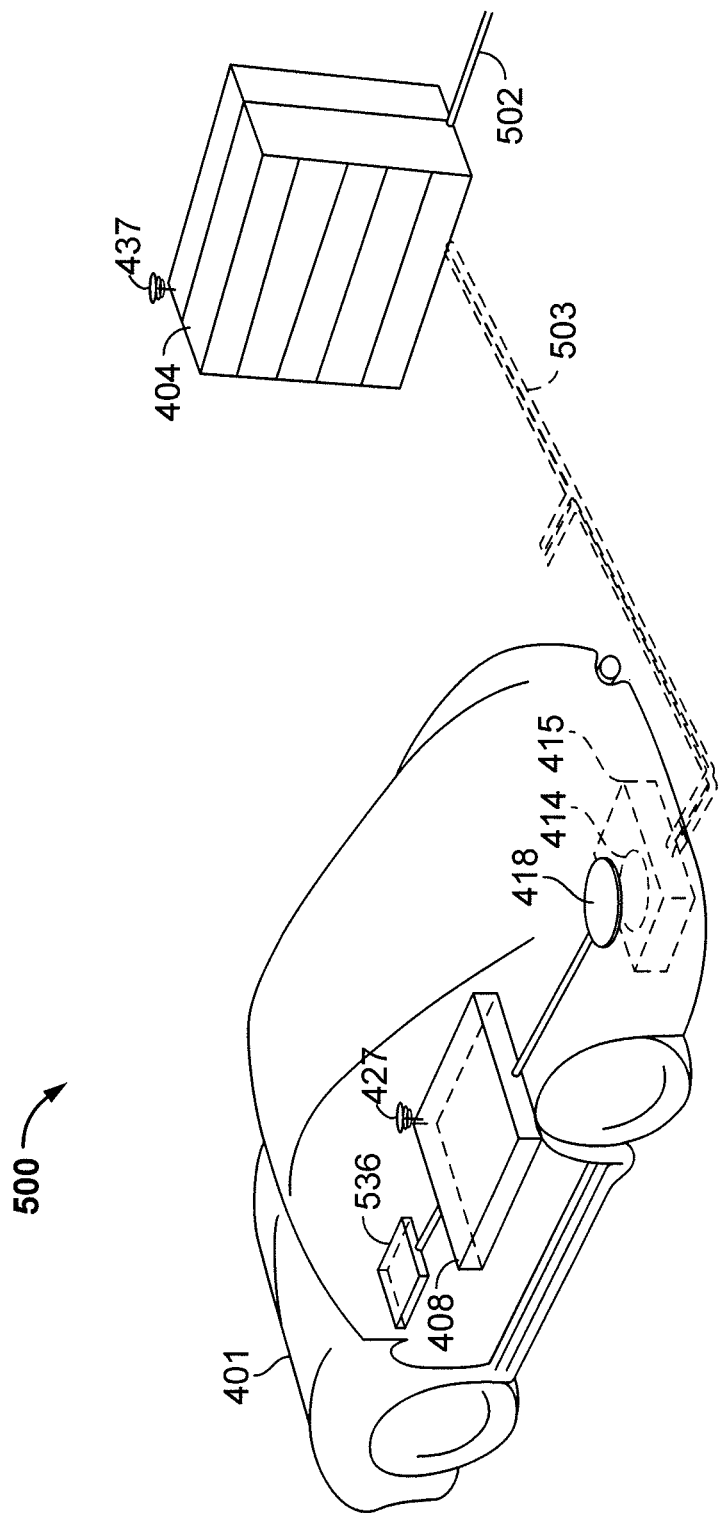
FIG. 5 is a diagram of a vehicle aligned over a transmitter coil, in accordance with an exemplary implementation.

FIG. 5 is a diagram of a vehicle aligned over a transmitter coil, in accordance with an exemplary implementation of the invention. The wireless power transfer system 500 enables charging of the vehicle 401 while the vehicle 401 is parked near the transmitter 404. Space is shown for the vehicle 401 to be parked over the transmit coil 414. The transmit coil 414 may be located within a base pad 415. In some implementations, the transmitter 404 may be connected to a power backbone 502. The transmitter 404 may be configured to provide an alternating current (AC), through an electrical connection 503, to the transmit coil 414 located within the base pad 415. As described in connection with FIG. 4 above, the vehicle 401 may include a battery 536, the receive coil 418, and the antenna 427 each connected to the receiver 408.

In some implementations, the receive coil 418 may receive power when the receive coil 418 is located in a wireless (e.g., magnetic or electromagnetic) field produced by the transmit coil 414. The wireless field corresponds to a region where energy output by the transmit coil 414 may be captured by the receive coil 418. In some cases, the wireless field may correspond to the "near field" of the transmit coil 414.

It is desirable that the receive coil 418 provides at least a minimum rated current or power to the receiver 404 in order to charge the battery 536 or power the vehicle 401. The minimum rated current or power may include additional electrical load requirements in addition to charging the battery 536, for example, any electrical requirements of one or more electronic devices within and powered by the vehicle 401. Not all vehicles are designed to be compatible with all charging systems. Such incompatibility may affect the performance of wireless charging systems. One solution may include pre-testing several wireless charging systems with several electric vehicles to provide a compatibility list. Another solution may further include pre-testing against a standard set of magnetics for electric vehicle-side charging. Unless multiple alignment positions are tested for each wireless charging system and electric vehicle combination (or set of standard magnetics), such solutions may not provide a comprehensive, accurate compatibility assessment.

For robust and dependable operation, the receiver 404 aboard the vehicle 401 may determine compatibility between the transmit coil 414 and the receive coil 418. If the transmit coil 414 and the receive coil 418 are able to work together to provide at least a minimum rated power output for the vehicle 401 for a given alignment, the transmit coil 414 and the receive coil 418 may be determined compatible. Such a compatibility determination may be made regardless of the alignment between the transmit coil 414 and the receive coil 418. Such a compatibility determination may further be made regardless of whether the transmit coil 414 and the receive coil 418 belong to the same wireless power transfer system. Compatibility detection is further described in connection with FIGS. 6 and 7 below.

Figure 6:
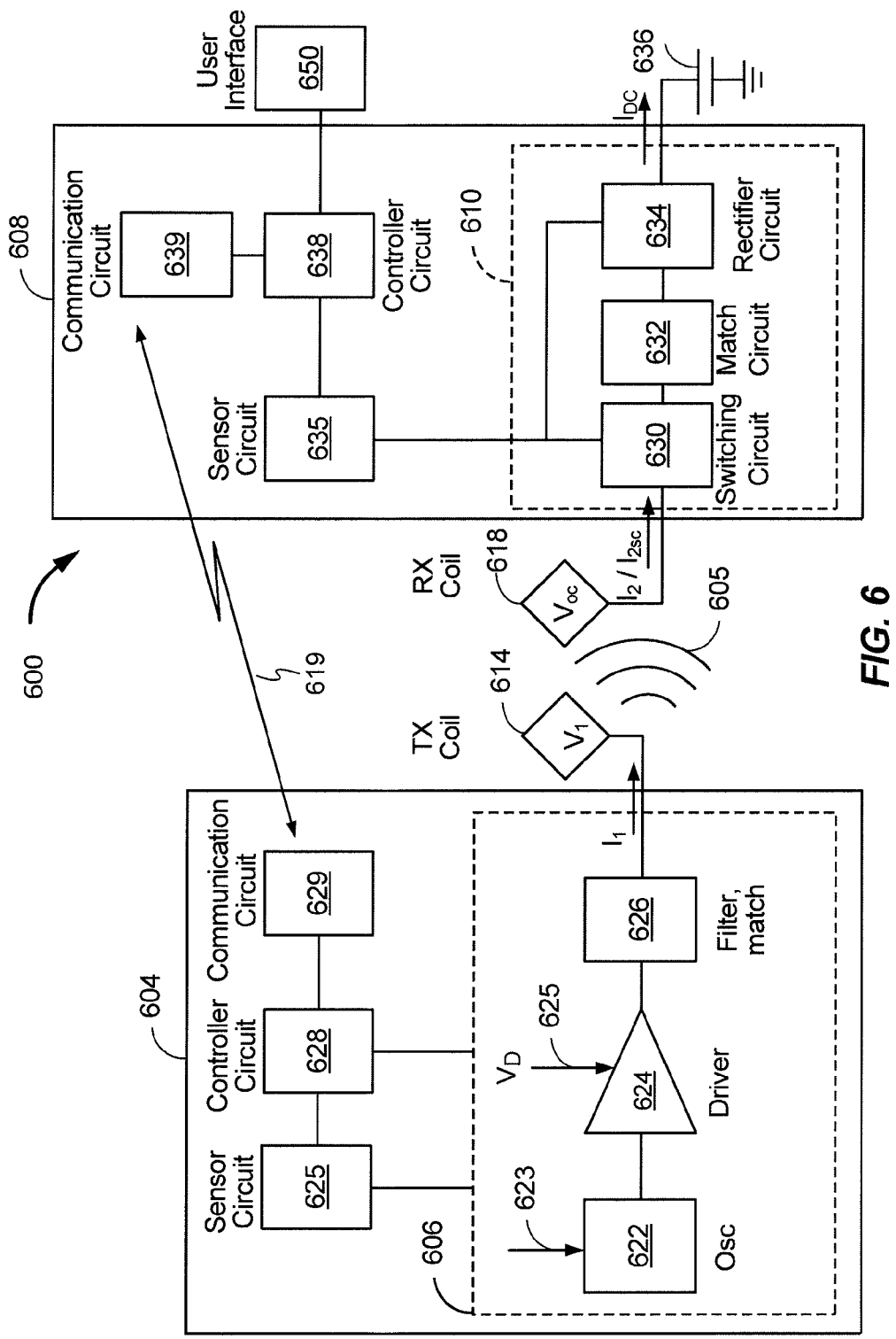
FIG. 6 is a functional block diagram of a wireless power transfer system having alignment and compatibility detection, in accordance with an exemplary implementation.

FIG. 6 is a functional block diagram of a wireless power transfer system 600 having alignment and compatibility detection, in accordance with an exemplary implementation of the invention. The system 600 includes a transmitter 604 and a receiver 608. The transmitter 604 may include a communication circuit 629 electrically connected to a transmit circuitry 606. The transmit circuitry 606 may include an oscillator 622, a driver circuit 624, and a filter and matching circuit 626. The oscillator 622 may be configured to generate a signal at a desired frequency that may be adjusted in response to a frequency control signal 623. The oscillator 622 may provide the oscillator signal to the driver circuit 624. The driver circuit 624 may be configured to drive a transmit coil 614 at, for example, a resonant frequency of the transmit coil 614 based on an input voltage signal ($V_D$) 625. In one non-limiting example, the driver circuit 624 may be a switching amplifier configured to receive a square wave from the oscillator 622 and output a sine wave.

The filter and matching circuit 626 may filter out harmonics or other unwanted frequencies and match the impedance of the transmitter 604 to the transmit coil 614. As a result of driving the transmit coil 614, the transmit coil 614 may generate a wireless field 605 to wirelessly output power at a level sufficient for charging a battery 636 of an electric vehicle, for example. Unless stated otherwise, each component within the transmit circuitry 606 may have substantially the same functionality as the respective component within the transmit circuitry 206 as previously described in connection with FIG. 2.

The transmitter 604 may further include a controller circuit 628 electrically connected to a communication circuit 629. The communication circuit 629 may be configured to communicate with the communication circuit 639 within the receiver 604 over a communications link 619. The transmitter 603 may further include a sensor circuit 625 coupled to the transmit circuitry 606 and to the controller circuit 628. The sensor circuit 625 may be configured to measure a current output by the transmit circuitry 606 to the transmit coil 614 and may communicate that information to the controller circuit 628.

The receiver 608 may include a receive coil 618 and a receive circuitry 610. The receive circuitry 610 may include a switching circuit 630, a match circuit 632, and a rectifier circuit 634. The receive coil 618 may be electrically connected to the switching circuit 630. The switching circuit may selectively connect the receive coil 618 to the match circuit 632 or short circuit terminals of the receive coil 618 together. The match circuit 632 may be electrically connected to the rectifier circuit 634. The rectifier circuit 634 may provide a DC current to a battery 636. Unless stated otherwise, each component within the receive circuitry 610 may have substantially the same functionality as the respective component within the receive circuitry 210 as previously described in connection with FIG. 2.

The receiver 608 may further include a sensor circuit 635 configured to sense a short circuit current or an open circuit voltage of the receive coil 618 and/or a DC current output from the rectifier circuit 634. A controller circuit 638 may be electrically connected to, and receive sensor data from, the sensor circuit 635. A user interface 650 may also be electrically connected to the controller circuit 638 and configured to provide feedback to a driver of the vehicle regarding a level of coupling, alignment or compatibility between the receive coil 618 and the transmit coil 614. A communication circuit 639 may be connected to the controller circuit 638. The communication circuit 639 may be configured to communicate with the communication circuit 629 within the transmitter 604 over the communications link 619.

To provide power from the transmitter 604 to the receiver 608, energy may be transmitted from the transmit coil 614 to the receive coil 618 through a wireless field (e.g., a magnetic or electromagnetic field) 605. The transmit coil 614 and the transmit circuitry 606 form a resonant circuit having a particular resonant frequency. The receive coil 618 and the receive circuitry 610 form another resonant circuit having a particular resonant frequency. Because electromagnetic losses are minimized between two coupled resonant systems having the same resonant frequency, it is desirable for the resonant frequency associated with the receive coil 618 to be substantially the same as the resonant frequency associated with the transmit coil 614. Thus, it is further desirable that the tuning topology for one or both of the transmit coil 614 and the receive coil 618 is not significantly affected by inductance or load changes.

In one implementation, the transmit circuitry 606 provides an AC current $I_1$, e.g., sometimes referred to as a primary current, to the transmit coil 614, in accordance with the following equation:

$$I_1 = I_{1max}/\beta$$

where $I_{1max}$ is a maximum AC current that the transmit circuitry 606 may provide to the transmit coil 614.

It is desirable that the current $I_1$ be a fraction or percentage of the maximum current $I_{1max}$, e.g., 10%, 15%, 20%, 25%, etc., of $I_{1max}$. Thus, the ratio $\beta$ corresponds to the reciprocal of that percentage or fraction. It is further desirable that the transmit circuitry 606 be able to provide the current $I_1$ as a substantially constant current. The transmit coil 614 produces the wireless field 605 based on the current $I_1$. When substantially aligned with the transmit coil 614, the receive coil 618 may be located substantially within the wireless field 605. Thus, the receive coil 618 may be magnetically or electromagnetically coupled to the transmit coil 614. The wireless field 605 induces an AC current $I_2$, e.g., sometimes referred to as a secondary current, in the receive coil 618.

In a charging mode, the rectifier circuit 643 converts the AC current $I_2$ into a direct current (DC) charging current $I_{dc}$. The DC charging current $I_{dc}$ is proportional to the current $I_1$ in accordance with the following equation:

$$I_{dc}=1.1k_{12}\sqrt{(L_1/L_2)}I_1=1.1K_{12}I_1$$

where $I_{dc}$ is measured in amperes, 1.1 is an approximate rectification scaling factor equal to $\pi/(2\sqrt{2})$, $k_{12}$ is a coupling factor between the transmit coil 614 and the receive coil 614, $L_1$ and $L_2$ are inductances of the transmit coil 614 and the receive coil 618, respectively, $I_1$ is represented as a root mean square (RMS) of the AC current in amperes, and $K_{12}$ is "kappa" or the coupling factor $k_{12}$ normalized to the ratio of the transmit coil 614 inductance to the receive coil 618 inductance.

Accordingly, a maximum DC charging current $I_{dcmax}$ that the receive coil 618 may produce is proportional to the maximum current $I_{1max}$ provided to the transmit coil 614. This is true for any given alignment between transmit coil 614 and receive coil 618, in accordance with the following equation:

$$I_{dcmax}=1.1K_{12}I_{1max}$$

Further, $K_{12}$ may vary depending on the alignment between the transmit coil 614 and the receive coil 618. Because $K_{12}$ represents a normalized coupling factor between transmit coil 614 and receive coil 618, $K_{12}$ may be expressed as the ratio of the short circuit current $I_{2sc}$ flowing through the receive coil 618 to the current $I_1$ flowing through the transmit coil 614, in accordance with the following equation:

$$K_{12}=I_{2sc}/I_1$$

$K_{12}$ may also be expressed as the ratio of an open circuit voltage $V_{oc}$ across the receive coil 618 to a voltage $V_1$ across the transmit coil 614, in accordance with the following equation:

$$K_{12}=V_{oc}/V_1$$

To measure the current $I_{2sc}$, the switching circuit 630 short circuits the terminals of the receive coil 618 through the sensor circuit 635, as further described in greater detail in FIG. 7 below. In another implementation, the short circuit current $I_{2sc}$ may be inferred or determined using the charging current $I_{dc}$ while the receiver circuitry 610 is providing power to the battery 636. For example, the relationship between the charging current $I_{dc}$ and what the short circuit current $I_{2sc}$ would be may be inferred or determined in accordance with the following equation:

$$I_{2sc}=I_{dc}/1.1$$

In yet another implementation, a value of the short circuit current $I_{2sc}$ may be inferred or determined by measuring the open circuit voltage $V_{oc}$ across the terminals of the receive coil 618. For example, the relationship between the open circuit voltage $V_{oc}$ and the short circuit current $I_{2sc}$ may be inferred or determined in accordance with the following equation:

$$I_{2sc}=V_{oc}/\omega L_2$$

where $\omega$ is the AC frequency in radians per second and $L_2$ is the inductance of the receive coil 618. To measure the voltage $V_{oc}$, the switching circuit 630 may open circuit the terminals of the receive coil 618 across the sensor circuit 635, as further described in greater detail in FIG. 7 below.

Referring to FIG. 6, the transmit circuitry 606 may set the current $I_1$ to the ratio $\beta$ of the maximum current $I_{1max}$. The transmit circuitry 606 may provide the current $I_1$ to the transmit coil 614. Where dynamic measurement of the current $I_1$ is desired, the sensor circuit 625 may measure the current $I_1$ applied to the transmit coil 614 so that the receiver 608 may receive an indication of the value of the current $I_1$. The sensor circuit 625 may communicate the measurement to the controller circuit 628. In an implementation where the open circuit voltage $V_{oc}$ across the receive coil 618 may be measured, the sensor circuit 625 may measure a voltage $V_1$ across the terminals of the transmit coil 614. The sensor circuit 625 may communicate the measurement to the controller circuit 628. Similar to the relationship between $I_1$ and $I_{1max}$, a ratio of a maximum voltage $V_{1max}$ across the transmit coil 614, induced by the current $I_{1max}$, to the voltage $V_1$, induced by the current $I_1$, is also $\beta$.

In one implementation, the receiver 608 may request the ratio $\beta$ from the transmitter 604. The communication circuit 629 may communicate the ratio $\beta$ to the communication circuit 639 within the receiver 608. The communication circuit 629 may further communicate at least one of the value of the current $I_1$ and the value of the voltage $V_1$ to the communication circuit 629. The communication circuit 639 may communicate the received ratio $\beta$ and at least one of the value of $I_1$ and the value of $V_1$ to the controller circuit 638. In this way, the receiver 608 may store in a memory unit (not shown) the values of the ratio $\beta$ and at least one of the current $I_1$ and the voltage $V_1$ based on information provided by the transmitter 604. In an alternative implementation where $\beta$ is standardized, the controller circuit 638 may have already saved $\beta$ to the memory unit. In such a case, the communication circuit 629 may only communicate at least one of the value of the current $I_1$ and the value of the voltage $V_1$ and not the standardized value of $\beta$ to the communication circuit 639.

Once the current $I_1$ is applied to the transmit coil 614, the transmit coil forms the wireless field 605. The wireless field 605 may induce the short circuit current $I_{2sc}$ in the receive coil 618 since the terminals of the receive coil 618 are shorted together. The sensor circuit 635 may measure the value of the current $I_{2sc}$. The sensor circuit 626 may then communicate the value of the current $I_{2sc}$ to the controller circuit 638.

In an implementation where the open circuit voltage $V_{oc}$ is measured, the switching circuit 630 may open circuit the terminals of the receive coil 618 and the sensor circuit 635 may measure the value of the voltage $V_{oc}$. The sensor circuit 635 may then communicate the value of the voltage $V_{oc}$ to the controller circuit 638.

The controller circuit 638 may then use the measured current $I_{2sc}$ and the received value of the current $I_t$ to determine the normalized coupling factor $K_{12}$, in accordance with the previously described equation $K_{12}=I_{2sc}/I_1$. In an implementation where the open circuit voltage $V_{oc}$ is measured, the controller circuit 638 may use the measured voltage $V_{oc}$ and the received voltage $V_1$ to determine the normalized coupling factor $K_{12}$, in accordance with the previously described equation $K_{12}=V_{oc}/V_1$. The controller circuit 638 may utilize the ratio $\beta$ and the received value of the current $I_t$ to determine $I_{1max}$, in accordance with the previously described equation $I_1=I_{1max}/\beta$, which may be rearranged to $I_{1max}=\beta I_1$. The controller circuit 638 may then use the determined values for $K_{12}$ and $I_{1max}$ to determine the maximum DC charging current for the receiver 608, in accordance with the previously described equation $I_{dcmax}=1.1K_{12}I_1$.

It may be desirable to determine whether the transmitter 604 is capable of providing at least a required threshold charging current $I_{thresh}$ to the battery in a particular alignment. The current $I_{thresh}$ may be a predetermined or known current relating to a particular battery or vehicle system. To make such a determination, the controller circuit 638 may compare the short circuit current $I_{2sc}$ to the required threshold charging current $I_{thresh}$ divided by 1.1 times the ratio $\beta$, according to the inequality:

$$I_{2sc} > I_{thresh}/1.1\beta$$

If $I_{2sc}$ is greater than the current $I_{thresh}/1.1\beta$, the controller circuit 638 determines that the transmitter 604 may be capable of providing at least the required threshold charging current to the battery 636 using the current alignment. The controller circuit 638 may direct the communication circuit 639 to transmit an indication to initiate charging to the communication circuit 629 over the communication link 619. The controller circuit 638 may further provide an indication to a driver of the vehicle 401, via the user interface 650 for example, and/or to one or more other systems that proper (e.g., compatible) charging is possible in the current alignment. The controller circuit 638 may then direct the switching circuit 630 to remove the short circuit connection from the receive coil 618. The switching circuit 630 may connect the receive coil 618 to the match circuit 632. The receive coil 618 may now provide power to the battery 636 and charging may begin.

If $I_{2sc}$ is less than the current $I_{thresh}/1.1\beta$, the controller circuit 638 determines that the transmitter 604 may not be capable of providing at least the required threshold charging current to the battery 636 with the existing alignment. The controller circuit 638 may direct the communication circuit 639 to transmit an indication to not initiate charging to the communication circuit 629 over the communication link 619. The controller circuit 638 may further provide an indication to the driver of the vehicle 401 and/or to one or more other systems, via the user interface 650 for example, that proper (e.g., compatible) charging is not possible in the current alignment. In such an instance, the receive coil 618 will not provide power to the battery 636 and charging will not begin. In this way, the transmitter 604 may receive indication that the system 600 is outside of an acceptable alignment or operating zone (not shown) for providing rated capabilities. The controller circuit 638 may determine the operating zone as a geometric area over, surrounding, or near the transmit coil 614. Within the operating zone, when the transmit coil 614 is driven by the primary current $I_1$, the short-circuit current $I_{2sc}$ of the receive coil 618 will be such that the inequality $I_{2sc} > I_{thresh}/1.1\beta$ is satisfied. More particularly, the controller circuit 638 may define positions within the operating zone of the receive coil 618 with respect to the transmit coil 614 to maintain satisfaction of the inequality $I_{2sc} > I_{thresh}/1.1\beta$. In contrast, positions of the receive coil 618 where the inequality is not satisfied fall outside the operating zone. Therefore, some implementations may allow establishing of the operating zone for the receive coil 618 without any pre-knowledge of the characteristics of the vehicle or charging system.

In another implementation, it may be desirable to determine whether the transmitter 604 is capable of providing at least a required threshold charging voltage $V_{thresh}$ to the battery in a particular alignment. The voltage $V_{thresh}$ may be a predetermined or known current relating to a particular battery or vehicle system. To make such a determination, the controller circuit 638 may compare the open circuit voltage $V_{oc}$ to the voltage $V_{thresh}$ divided by 1.1 times the ratio $\beta$, according to the inequality:

$$V_{oc} > V_{thresh}/1.1\beta$$

If $V_{oc}$ is greater than the voltage $V_{thresh}/1.1\beta$, the controller circuit 638 determines that the transmitter 604 may be capable of providing at least the required threshold charging voltage to the battery 636 using the current alignment. The controller circuit 638 may direct the communication circuit 639 to transmit an indication to initiate charging to the communication circuit 629 over the communication link 619. The controller circuit 638 may further provide an indication to a driver of the vehicle 401 and/or to one or more other systems that proper charging is possible in the current alignment. The controller circuit 638 may then direct the switching circuit 630 to remove the open circuit connection from the receive coil 618. The switching circuit 630 may connect the receive coil 618 to the match circuit 632. The receive coil 618 may now provide power to the battery 636 and charging may begin.

If $V_{oc}$ is less than the voltage $V_{thresh}/1.1\beta$, the controller circuit 638 determines that the transmitter 604 may not be capable of providing at least the required threshold charging voltage to the battery 636 with the existing alignment. The controller circuit 638 may direct the communication circuit 639 to transmit an indication to not initiate charging to the communication circuit 629 over the communication link 619. The controller circuit 638 may further provide an indication to the driver of the vehicle 401 and/or to one or more other systems that proper charging is not possible in the current alignment. In such an instance, the receive coil 618 will not provide power to the battery 636 and charging will not begin. In this way, the transmitter 604 may receive indication that the system 600 is outside of the acceptable alignment or operating zone for providing rated capabilities similar to that disclosed above with respect to the short circuit current $I_{2sc}$ above.

According to the above description, the controller circuit 638 may determine the maximum possible output current or voltage for any position of the receive coil 618 with respect to the transmit coil 614. The controller circuit 638 may make such a determination before supplying current to the battery 636. In another implementation, the controller circuit 638 may make such a determination during charging of the battery 636. In yet another implementation the controller circuit 638 may make such a determination while the driver of the vehicle 401 is driving the vehicle 401 into a space for charging. Such implementations may provide a safety mechanism to ensure charging current and/or voltage remain within safe limits during the charging cycle.

For example, under certain conditions, overcoupling between the transmit coil 614 and the receive coil 618 can cause undesirable stresses in one or both of the transmitter 604 and the receiver 608. Either the controller circuit 638 in the receiver 608 or the controller circuit 628 in the transmitter 604 may detect such overcoupling. Either the controller circuit 638 in the receiver 608 or the controller circuit 628 in the transmitter 604 may take corrective action in response to detecting the overcoupling. Such corrective action may include reducing the coupling $K_{12}$, reducing the drive current $I_1$, providing an indication via the user interface 650 to adjust alignment, shutting down power to the battery 636 on the receiver 608 side, and/or shutting down power to the transmit coil 614 on the transmitter 604 side.

As previously described, the controller circuit 638 may determine the coupling factor $K_{12}$ for each receive coil 618 utilizing measurements of the short circuit current $I_{2sc}$ or the open circuit voltage $V_{oc}$ according to the above-mentioned equations $K_{12}=I_{2sc}/I_1$ and $K_{12}=V_{oc}/V_1$, respectively. In other implementations, the controller circuit 638 may determine the coupling factor $K_{12}$ during charging in accordance with the above-mentioned DC current-to-short circuit current conversion equation $I_{2sc}=I_{dc}/1.1$. Because the controller circuit 638 may determine the coupling factor $K_{12}$ both during calibration before charging and during charging, the controller circuit 638 may continuously monitor the coupling factor $K_{12}$. The controller circuit 638 may then compare the determined coupling factor $K_{12}$ to a maximum coupling factor $K_{12max}$ according to the inequality:

$$K_{12} > K_{12max}$$

The controller circuit 638 may determine a maximum coupling factor $K_{12max}$. In the alternative, the controller circuit 638 may access a value of $K_{12max}$ stored in a memory (not shown) accessible to the controller circuit 638. If the above inequality is satisfied, the controller circuit 638 may determine a state of overcoupling. The controller circuit 638 may then cause one of the above-mentioned corrective actions to be performed.

Figure 7:
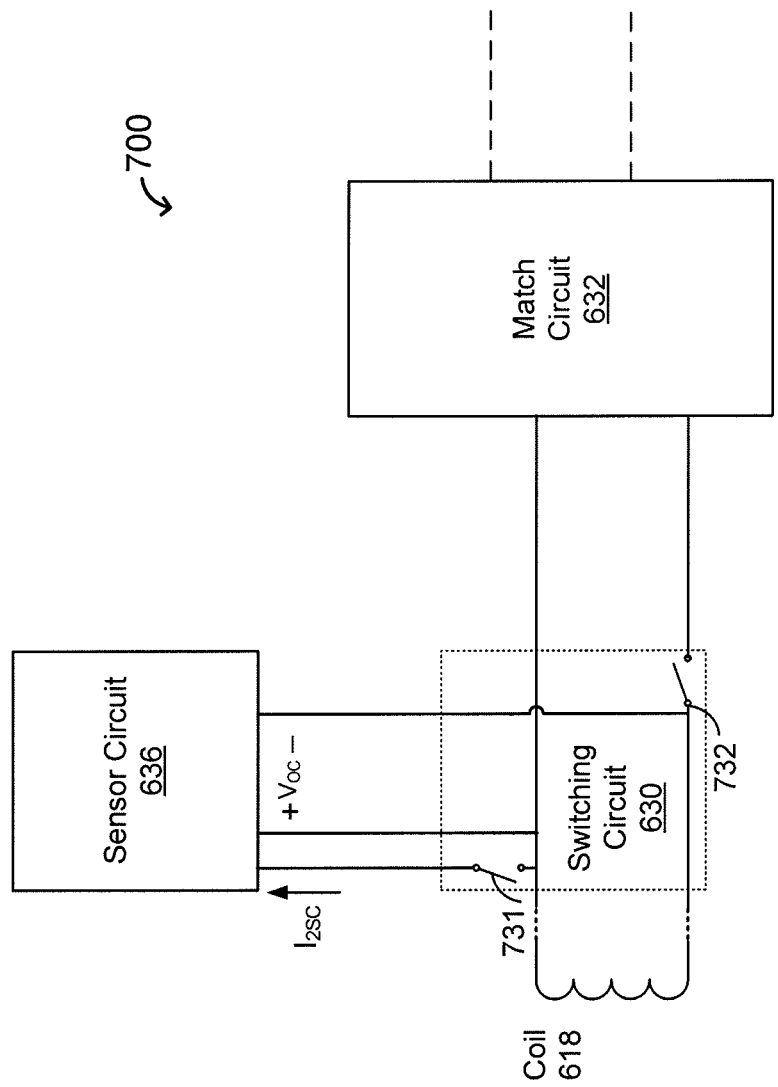
FIG. 7 is a schematic diagram of a portion of the receive circuitry of FIG. 6, in accordance with an exemplary implementation.

FIG. 7 is a schematic diagram of a portion of the receive circuitry of FIG. 6, in accordance with an exemplary implementation of the invention. FIG. 7 shows the receive coil 618 electrically connected to the switching circuit 630. The switching circuit 630 may include a switch 731 and a switch 732. A first terminal of the switch 731 is electrically connected to a first terminal of the receive coil 618 and to the match circuit 632. A second terminal of the switch 731 is electrically connected to the sensor circuit. A first terminal of the switch 732 is electrically connected to a second terminal of the receive coil 618 and to the sensor circuit. A second terminal of the switch 732 is electrically connected to the match circuit. Though the receive coil 618 is shown as connected to the switching circuit 630, one or more resonance circuit components may be connected between the receive coil 618 and the switching circuit 630, as represented by the dashed wire lines. Closing the switch 731 short circuits the terminals of the receive coil 618 through the sensor circuit 635. Opening the switch 732 effectively disconnects the receive coil 618 from the match circuit 632. Opening the switch 732 also effectively disconnects the battery 636 (not shown), situated downline from the match circuit 632. Where measuring the short circuit current $I_{2sc}$ would not be indicative of the power supply potential, the sensor circuit 635 may measure an open circuit voltage across the terminals of receive coil 618. In such an implementation, the switch 731 and the switch 732 may both be opened such that the switching circuit 630 may measure the open circuit voltage across the first terminal and the second terminal of the receive coil 618. Though the switching circuit 630 is shown as being located between the receive coil 618 and the match circuit 632, the present application is not so limited. For example, for certain tuning topologies, the switching circuit 630 may be located after the match circuit 632 so long as an effective measurement of the short circuit current $I_{2sc}$ or the open circuit voltage $V_{oc}$ may be made or inferred.

Figure 8:
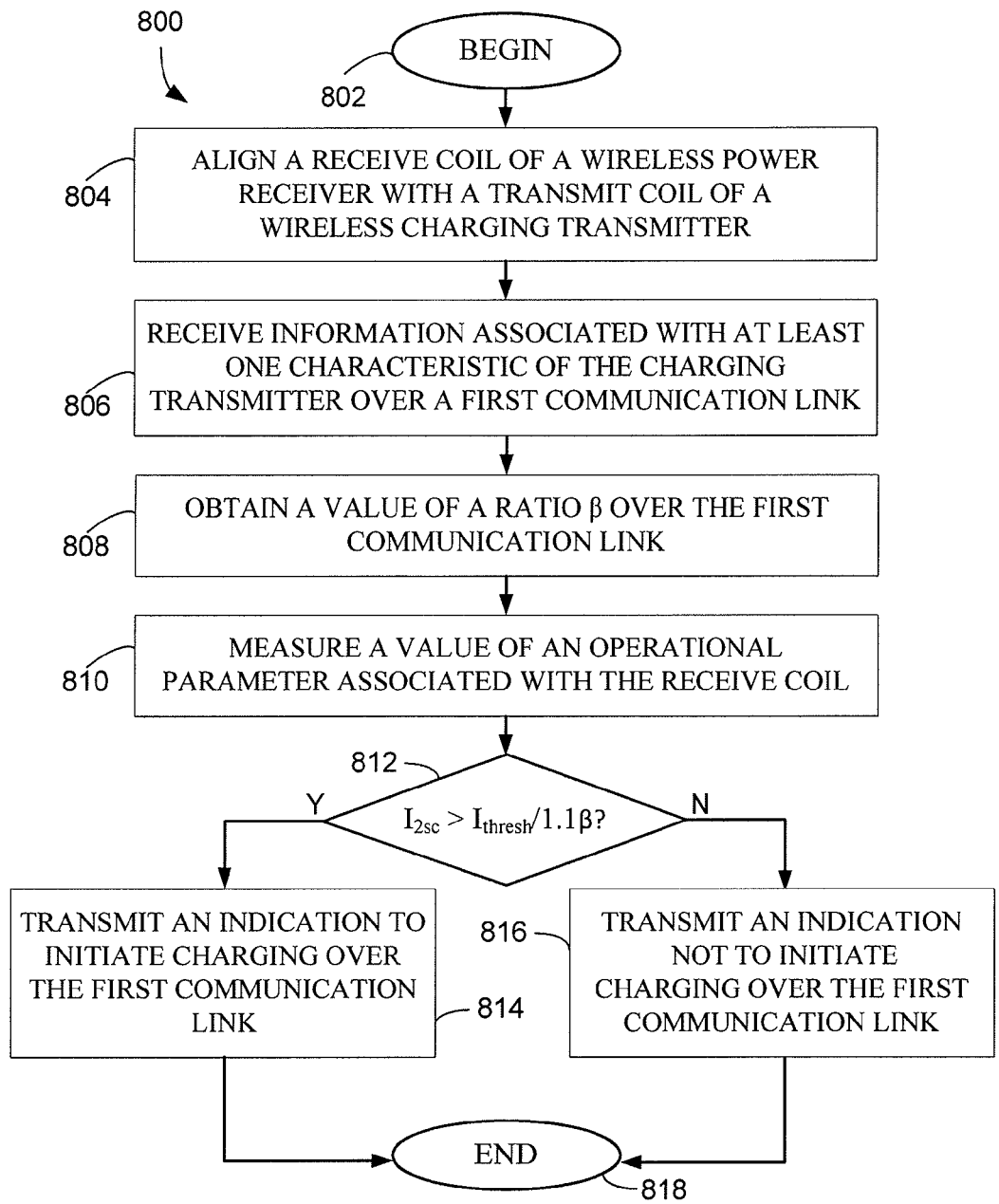
FIG. 8 illustrates a flowchart of a method for alignment and compatibility detection for a wireless power transfer system, in accordance with an exemplary implementation.

FIG. 8 illustrates a flowchart of a method for alignment and compatibility detection for a wireless power transfer system, in accordance with an exemplary implementation.

The method of flowchart 800 is described herein with reference to the wireless power transfer system 600, as previously described in connection with FIG. 6. In an implementation, one or more of the steps in flowchart 800 may be performed by a controller such as, for example, the controller circuit 638 of FIG. 6. Although the method of flowchart 800 is described herein with reference to a particular order, in various embodiments, steps herein may be performed in a different order, or omitted, and additional steps may be added.

At step 802, the method begins. The method continues at step 804 by aligning a receive coil of a wireless power receiver with a transmit coil of a wireless charging transmitter. For example, the vehicle 401 may be aligned such that the receive coil 418 of the receiver 408 is substantially aligned over the transmit coil 414 of the transmitter 404, as previously described in connection with FIG. 5.

At step 806, the method includes receiving information associated with at least one characteristic of the charging transmitter over a first communication link. For example, the communication circuit 639 may receive the value of at least one of the current $I_1$ and the voltage $V_1$ from the communication circuit 629 of the transmitter 604 over the communications link 619. In another implementation, the information representative of at least one of the value of the current $I_1$ or the voltage $V_1$ may be received over the communication link 619. At least one of the value of the current $I_1$ and the value of the voltage $V_1$ may be determined based on the information signal, such as via a look up table in memory or querying a data service (not shown).

At step 808, the method includes obtaining a value of β over the first communication link. For example, the communication circuit 639 may receive the ratio β from the communications circuit 629 of the transmitter 604 over the communications link 619. The communications link 619 may be any type of communications link including but not limited to Bluetooth, Zigbee, or cellular. In another implementation, the ratio β may already be known, as a standardized value. In such an implementation, the communications circuit 639 may not receive the ratio β over the communications link 619, but instead β may be determined from a memory or queries from a known data service (not shown).

The method may continue at step 810, which includes measuring a value of an operational parameter associated with the receive coil 618. For example, the sensor circuit 635 may measure the short circuit current $I_{2sc}$ through the receive coil 618, as previously described in connection with FIGS. 6 and 7. In another implementation, the sensor circuit 635 may measure the open circuit voltage $V_{oc}$ across the receive coil 618, as previously described in connection with FIGS. 6 and 7.

At step 812, the method continues by comparing the value of parameter to a threshold charging parameter sufficient to charge the load. The controller circuit 638 may perform the comparison between the current $I_{2sc}$ and the required threshold charging current $I_{thresh}$ divided by 1.1 times β. If $I_{2sc}$ is greater than the threshold charging current $I_{thresh}/1.1β$, the transmitter 604 may be capable of providing at least the minimum required charging current to the battery 636 with the current alignment. In such a case, the method may continue to step 814, which includes transmitting an indication to initiate charging over the first communication link. For example, the communication circuit 639 may transmit an indication to initiate charging to the communication circuit 629 over communications link 619. At this point the method may end with end step 818.

Returning to decision block 812, if $I_{2sc}$ is not larger than the required threshold charging current $I_{thresh}/1.1\beta$, the receiver 608 may be regarded as incompatible with the transmitter 604 in the current alignment. The transmitter 604 may not be capable of providing at least the minimum required charging current to the battery 636 with the current alignment. In such a case, the method may continue to step 816, which includes transmitting an indication not to initiate charging over the first communication link. For example, the communication circuit 639 may transmit an indication not to initiate charging to the communication circuit 629 over communications link 619. In another implementation, the communication circuit 639 may not transmit any indication whatsoever and charging will not begin. In yet another implementation the communication circuit 639 may transmit an indication that the receive coil 618 is out of an acceptable alignment or operating zone and/or will be unable to provide rated power. At this point the method may end with end step 818.

In another implementation, where the open circuit voltage $V_{oc}$ is measured instead of the short circuit current $I_{2sc}$, step 812 may include the controller circuit 638 performing the comparison between the voltage $V_{oc}$ and the required threshold charging voltage $V_{thresh}$ divided by 1.1 times $\beta$. If $V_{oc}$ is greater than the threshold charging voltage $V_{thresh}/1.1\beta$, the transmitter 604 may be capable of providing at least the minimum required charging voltage to the battery 636 with the current alignment. If $V_{oc}$ is less than the required threshold charging voltage $V_{thresh}/1.1\beta$, the receiver 608 may be regarded as incompatible with the transmitter 604 in the current alignment. The transmitter 604 may not be capable of providing at least the minimum required charging voltage to the battery 636 with the current alignment.

Figure 9:
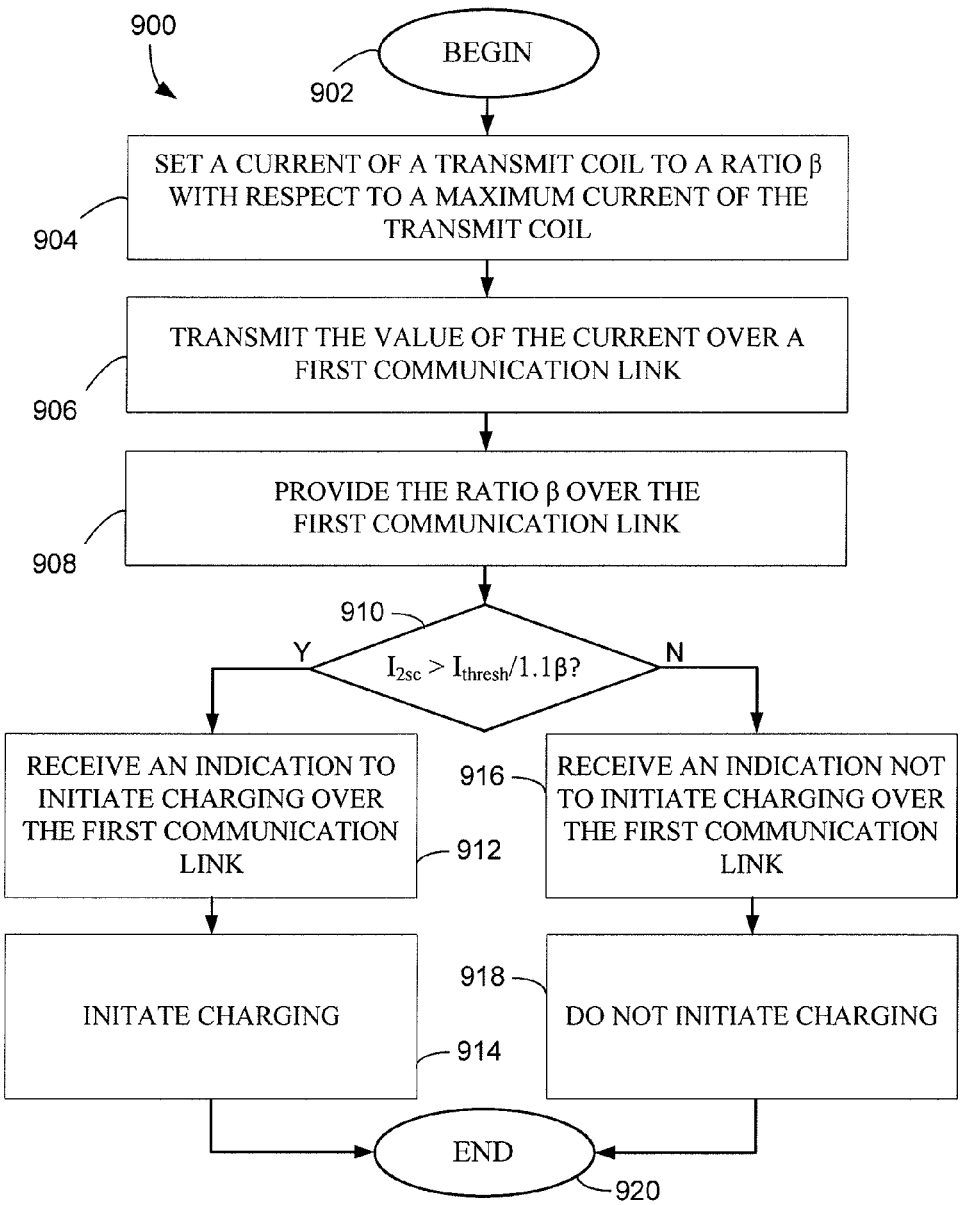
FIG. 9 illustrates a flowchart of another method for alignment and compatibility detection for a wireless power transfer system, in accordance with an exemplary implementation.

FIG. 9 illustrates a flowchart of another method for alignment and compatibility detection for a wireless power transfer system, in accordance with an exemplary implementation. The method of flowchart 900 is described herein with reference to the wireless power transfer system 600, as previously described in connection with FIG. 6. In an implementation, one or more of the steps in flowchart 900 may be performed by a controller such as, for example, the controller circuit 628 of FIG. 6. Although the method of flowchart 900 is described herein with reference to a particular order, in various embodiments, steps herein may be performed in a different order, or omitted, and additional steps may be added.

At step 902, the method begins. At step 904 the method continues by setting a current of a transmit coil to a ratio $\beta$ with respect to a maximum transmit coil current. For example, the transmit circuitry 606 and/or the controller circuit 628 may set the current $I_1$ such that it has a predetermined ratio $\beta$ to the maximum current $I_{1max}$. In one implementation, a sensor circuit (not shown) may measure the current $I_1$ applied to the transmit coil 614. The sensor circuit may communicate the measurement to the controller circuit 628. In another implementation, the voltage across the transmit coil may be set to the ratio $\beta$ with respect to a maximum transmit coil voltage. For example, the transmit circuitry 606 and/or the controller circuit 628 may set the voltage $V_1$ such that it is a predetermined ratio $\beta$ to the maximum voltage $V_{1max}$. The sensor circuit (not shown) may measure the voltage $V_1$ applied to the transmit coil 614. The sensor circuit may communicate the measurement to the controller circuit 628.

At step 906, the method continues by transmitting the value of the transmit coil current over a first communication link. For example, the controller circuit 628 may direct the communication circuit 629 to communicate the value of the current $I_1$ to the communication circuit 629. In another implementation, the value of the transmit voltage may be transmitted over the first communication link. For example, the controller circuit 628 may direct the communication circuit 629 to communicate the value of the voltage $V_1$ to the communication circuit.

At step 908, the method continues by providing the ratio $\beta$ over the first communication link. For example, the controller circuit 628 may direct the communication circuit 629 to transmit the ratio $\beta$ to the communication circuit 639 over the communication link 619.

At this point of flowchart 900, the method may include a decision block 910, relating to the decision block 812 of flowchart 800 as described above. If $I_{2sc}$ is determined to be greater than $I_{thresh}/1.1\beta$, the method may continue to step 912, which includes receiving an indication to initiate charging over the first communication link. For example, the communication circuit 629 may receive such an indication to initiate charging from communication circuit 639 over communications link 619. In such a case, the method may continue with step 914, which may include initiating charging. For example, the controller circuit 628 may direct the transmit circuitry 606 to increase the current $I_1$ to the minimum required charging current to begin charging. At this point the method may end with end step 920.

Returning to decision block 910, if $I_{2sc}$ is not larger than $I_{thresh}/1.1\beta$, the method may continue to step 916, which includes receiving an indication not to initiate charging over the communication link. For example, the communication circuit 629 may receive an indication not to initiate charging from communication circuit 639 over communications link 619. In such a case, the method may continue with step 920, which may include not initiating charging. For example, the controller circuit 628 may direct the transmit circuitry 606 to continue to produce the current $I_1$ at the previous fraction of the maximal current $I_{1max}$, which may be lower than the minimum required charging current. In another implementation, the controller circuit 628 may direct the transmit circuitry 606 to stop producing the current $I_1$ altogether. In yet another implementation the communication circuit 639 may transmit an indication that the receive coil 618 is out of an acceptable alignment zone and/or will be unable to provide the minimum required charging current. At this point the method may end with end step 920.

In another implementation where $V_{oc}$ is measured rather than $I_{2sc}$, the decision block 910 may determine whether $V_{oc}$ is greater than $V_{thresh}/1.1\beta$. If so the method may continue to step 912, which includes receiving an indication to initiate charging over the first communication link. The method may then progress as described above. If $V_{oc}$ is less than $I_{thresh}/1.1\beta$, the method may continue to step 916 as described above.

Figure 10:
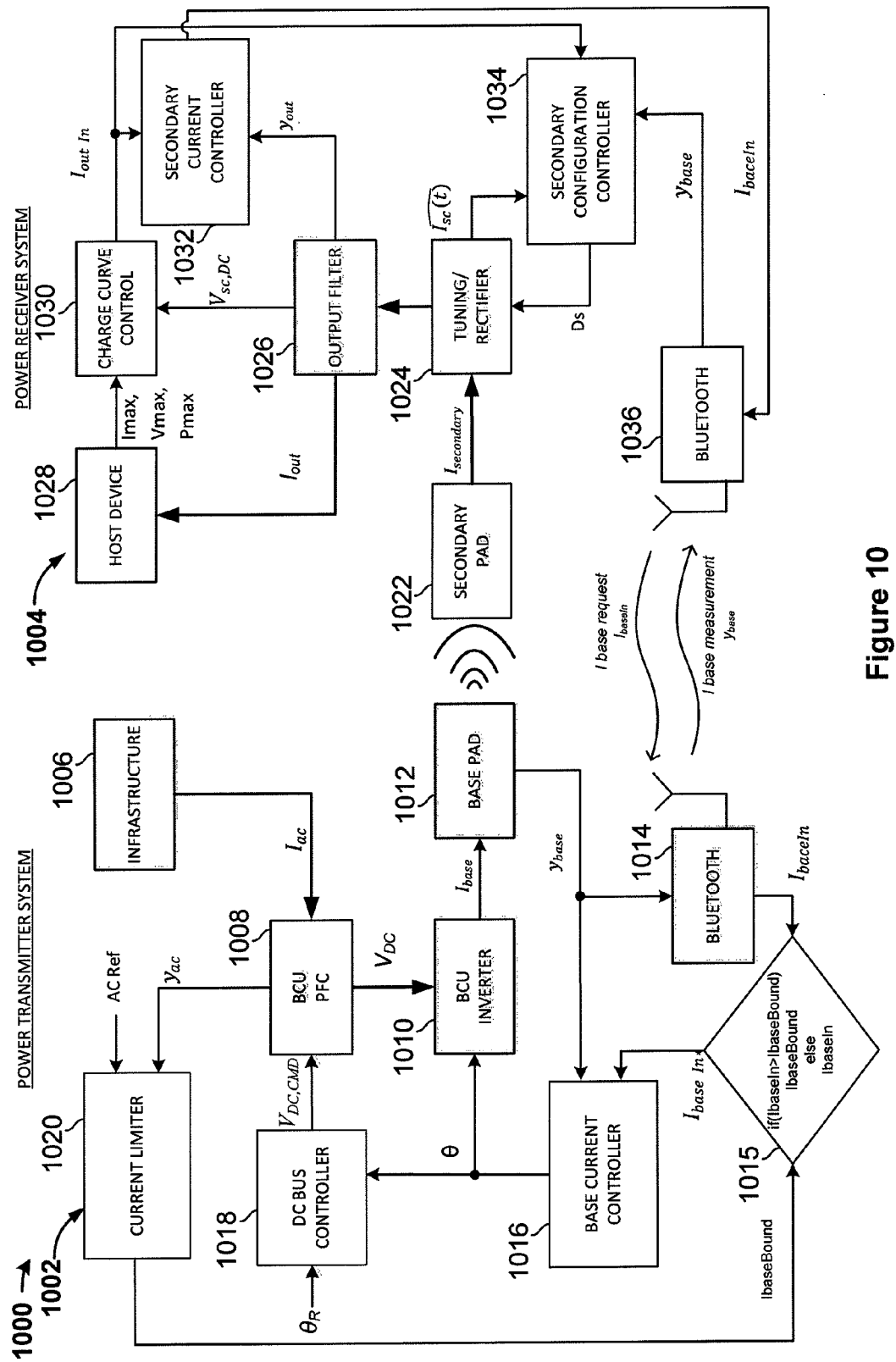
FIG. 10 shows a wireless power transfer system comprising a power transmitter system and a power receiver system, along with signal flow in accordance with an exemplary implementation.

FIG. 10 shows a wireless power transfer system 1000 comprising a power transmitter system 1002 and a power receiver system 1004 in accordance with an exemplary implementation. In one aspect of various embodiments described herein, the wireless power transfer system 1000 can provide interoperability between different receivers and transmitters. For example, one particular embodiment provides an interface between the receiver and transmitter that utilizes a small set of information (for example, simply a base current request) in a generic manner (e.g., normalized/relative levels). Unless stated otherwise, each component within the wireless power transfer system 1000 may have substantially the same functionality as the respective component as previously described in connection with FIGS. 2, 6, 7.

The illustrated power transmitter system 1002 includes a power source, interface, or infrastructure 1006, a base control unit (BCU) power factor correction (PFC) block 1008, a BCU inverter 1010, a base pad 1012, an optional communication antenna (such as, a Bluetooth antenna 1014), a decision block 1015, a base current controller 1016, a DC bus controller 1018, and a current limiter 1020. The BCU PFC block 1008 and the BCU inverter 1010 can correspond to the driver 624 and the filter/matching network 626 of FIG. 6. The base pad 1012 can correspond to transmit coil 614 of FIG. 6, but it will be appreciated that the base pad 1012 need not have a pad or coil configuration. That is, any suitable power antenna can be selected and used that generates a wireless field at a level sufficient for charging or powering the device to be charged. The decision block 1015, the base current controller 1016, the DC bus controller 1018, and the current limiter 1020 can correspond to the controller circuit 628 of FIG. 6. The optional communication antenna (such as, a Bluetooth antenna 1014) can correspond to the communication circuit 629 of FIG. 6.

The power receiver system 1004 can include a secondary pad 1022, a tuning/rectifier 1024, an output filter 1026, a host device 1028, a charge curve control block 1030, a secondary current controller 1032, a secondary configuration controller 1034, and an optional communication antenna (such as, a Bluetooth antenna 1036). The secondary pad 1022 can correspond to the receive coil 618 of FIG. 6, but it will be appreciated that the secondary pad 1022 need not have a pad or coil configuration. That is, any suitable power antenna can be selected and used that can receive a wireless field at a level sufficient for charging or powering the device to be charged. Additionally or alternatively, the secondary pad 1022 can include one or more antennas (not shown) that can be selectively activated (for example, connected to the load). The tuning/rectifier 1024 and the output filter 1026 can correspond to the switching circuit 630, the matching circuit 632, the rectifier circuit 634, and the sensor circuit 635 of FIG. 6. Additionally or alternatively, the tuning/rectifier 1024 and the output filter 1026 can provide a variable level output current based on a secondary pad current $I_{secondary}$ and a configuration control signal Ds. The charge curve control block 1030, the secondary current controller 1032, and the secondary configuration controller 1034 can correspond to the controller circuit 638 of FIG. 6. The optional communication antenna (such as, a Bluetooth antenna 1036) can correspond to the communication circuit 639 of FIG. 6.

The infrastructure 1006 can be configured to provide a power current $I_{ac}$. The infrastructure 1006 can correspond to one or more of an electrical mains, one or more batteries, solar panels, or the like electrical power sources configured to provide a power current $I_{ac}$. In the illustrated power transmitter system 1002, the infrastructure 1006 is operatively coupled to the BCU PFC block 1008 and provides the BCU PFC block 1008 the power current $I_{ac}$.

The BCU PFC BLOCK 1008 can be configured to receive the power current $I_{ac}$ and a commanded bias signal $V_{DC,CMD}$ and configured to provide a bias signal $V_{DC}$ and a measurement $y_{ac}$ of the power current $I_{ac}$. In the illustrated power transmitter system 1002, the BCU PFC block 1008 receives the power current $I_{ac}$ from the infrastructure, receives the commanded bias signal $V_{DC,CMD}$ from the DC bus controller 1018, provides the bias $V_{DC}$ to the BCU inverter, and provides the measurement signal $y_{ac}$ to the current limiter 1020.

The BCU inverter can be configured to receive the bias $V_{DC}$ and a phase control signal θ (or "conduction angle") and to generate a transmit antenna current $I_{base}$ (or "base pad current"). For example, the BCU inverter can generate the transmit antenna current $I_{base}$ based at least on the bias $V_{DC}$ and/or the phase control signal θ. In the illustrated embodiment, the BCU inverter receives the bias $V_{DC}$ from the BCU PFC block 1008, receives the phase control signal θ from the base current controller 1016, and provides the base pad 1012 the transmit antenna current $I_{base}$.

In one aspect, the BCU PFC block 1008 can be used to avoid excessive currents from the utility grid due to out of phase voltage and current, to avoid harmonic distortion due to other portions of the circuitry (e.g., switching action of a rectifier), and to filter the utility power at 50/60 Hz. The DC voltage from the BCU PFC BLOCK 1008 can be supplied to the BCU inverter, the output of which can be referred to as a bridge current or base current. The magnitude of the fundamental of the output of the BCU inverter is dependent on the DC bias voltage $V_{AC}$ received from the BCU PFC BLOCK 1008 and the phase control signal θ (which can take any value from 0° to 180°) of the inverter bridge according to the following equation:

$$V_i = \frac{4V_{DC}}{\pi}\sin\left(\frac{\theta}{2}\right). \tag{Eqn. 6}$$

In Equation 6, the phase control signal θ can correspond to a duty cycle. A higher phase control signal θ corresponds to more time that power is being delivered. A lower phase control signal θ translates to lower voltage and higher current for the same power. Lower phase control signals θ require higher currents. In some implementations, the BCU inverter operates at phase control signals θ over 90°. Avoiding lower phase control signals θ and their associated higher currents can reduce component stress. If the BCU inverter is run at substantially 130°, then the total harmonic distortion (THD) of the output voltage may be reduced. As the BCU inverter increases the phase control signal θ from 120° to approximately 130°, third order harmonics increase as fifth order harmonics decrease. THD does not vary much between 120° and 130°, and increases slowly as it approaches 140°. Some implementations operate in the range of 115° to 140°.

The base pad 1012 can be configured to receive the transmit antenna current $I_{base}$ and to generate a wireless field for transmitting power. In some embodiments the base pad 1012 can be configured to provide a measurement $y_{base}$ indicative of the level of the transmit antenna current $I_{base}$. The measurement signal $y_{base}$ can correspond to any suitable characteristic, not necessarily a current, that is related to the transmit antenna current $I_{base}$. For example, sample characteristics can include sensed voltages, auxiliary currents, impedances, electromagnetic fields, in the like characteristics. In the illustrated embodiment, the base pad 1012 receives the transmit antenna current $I_{base}$ from the BCU inverter and provides the measurement $y_{base}$ to the base current controller 1016 and/or the Bluetooth antenna 1014. The base pad 1012 can include one or more antennas, including coil antennas, planar antennas, and the like devices for generating a wireless field sufficient for powering and/or charging devices.

The optional communication antenna, such as a Bluetooth antenna 1014, of the power transmitter system 1002 can be configured to receive one or more types of communications. For example, the communication antenna can be configured to receive signals, such as a current-request signal $I_{baseIn}$, and can be configured to transmit signals, such as a measurement signal $y_{base}$. It will be appreciated that a separate antenna from the base pad 1012 is not required for communication. Instead, the power transmitter system 1002 and the power receiver system 1004 can communicate, for example, by in-band signaling between the base pad 1012 and the secondary pad 1022, using uni-directional or bi-direction channels. Furthermore, communication can be made by physical links (such as, interconnected wired data communication paths) in addition or alternative to wireless communication.

The current-request signal $I_{baseIn}$ can be used to control the amount of current running through the base pad 1012, and in turn, the strength of the wireless field. For example, the power receiver system 1004 can be configured to control the current of the transmit antenna by transmitting the current-request signal $I_{baseIn}$ to the power transmitter system 1002 via Bluetooth communications. The current-request signal $I_{baseIn}$ can be indicative of a reference level of current for the transmit antenna. The "reference level" can mean the "target level," "commanded level," "desired value," or the like description indicating the (normalized) level of base current that power receiver is requesting that the base pad conduct. For example, the current-request signal $I_{baseIn}$ can be indicative an amount of current proportional to, or normalized by, a predetermined value. The normalized current-request signal can indicate that the base pad current $I_{base}$ should be adjusted, to the extent possible, in accordance with the current-request signal $I_{baseIn}$. The predetermined value can correspond to a current level (e.g., an upper limit of base pad current due to safety, standards, and/or the like requirements/objectives) of a power transmit protocol. The power transmit protocol can correspond to any suitable standards.

In operation, the power receiver system 1004 can receive a request as a factor or ratio, β. The request can be relative to a predetermined current level, such as some percentage of the operational limit of the base pad 1012—e.g., −10%, 30%, 40%, 57%, 90%, 100%, or 110% of a "maximum" base current—in contrast to a request for some specified current level, such as a specified amount of amperes.

In some embodiments, the power receiver system 1004 may not have access to the predetermined current level for the respective power transmitter system 1002. As will be discussed, the controllers of the power receiver system 1004 can be effective for compensating for the unknown predetermined current level. Moreover, the controllers of the power receiver system 1004 can be effective for sensing the capabilities of the power transmit system and for adjusting the current request signal $I_{baseIn}$ accordingly as to not damage the power transmitter system 1002. Furthermore, the controllers (e.g., the current limiter 1020) of the power transmitter system 1002 can be effective for preventing the power transmitter from entering operating points that may damage the power transmitter system 1002. Accordingly, requesting a relative of amount of current, opposed to an absolute amount, as described herein can aid in improving interoperability between various types of power transmitter systems 1002 and various types of power receiver systems 1004, while simplifying the process of wireless power transfer.

The decision block 1015 can be configured to receive the current request signal $I_{baseIn}$ and the upper bound signal $I_{baseBound}$ as inputs, and to generate the limited current request signal $I_{baseIn*}$ as an output. For example, in the illustrated embodiment, the decision block 1015 is operatively coupled to the optional Bluetooth antenna 1014 to receive the current request signal $I_{baseIn}$. The illustrated decision block 1015 is operatively coupled to the current limiter 1020 to receive the upper bound signal $I_{baseBound}$. The illustrated decision block 1015 is operatively coupled to the base current controller 1016 to provide the limited current.

In operation, the decision block 1015 can be configured to generate the limited current request signal $I_{baseIn*}$ based on the current request signal $I_{baseIn}$ and the upper bound signal $I_{baseBoundIn}$. In one embodiment, the decision block 1015 can be configured to output the limited current request signal $I_{baseIn*}$ as being substantially equal to the current request signal $I_{baseIn}$ if the current request signal $I_{baseIn}$ is less than the upper bound signal $I_{baseBound}$, and to output the limited current request signal $I_{baseIn*}$ as being substantially equal to the upper bound signal $I_{baseBound}$ otherwise.

The base current controller 1016 can be configured to receive the measurement $y_{base}$ of the transmit antenna current $I_{base}$ and a current-request signal $I_{baseIn}$ (or, alternatively the limited current-request signal $I_{baseIn*}$), and further configured to generate a phase control signal θ to adjust the power level of the wireless field generated by the base pad 1012. In the illustrated embodiment, the base current controller 1016 is operatively coupled to the base pad 1012, the optional Bluetooth antenna 1014, the decision block 1015, the BCU inverter, and the DC bus controller 1018. The base current controller 1016 generates the phase control signal θ based on the measurement signal $y_{base}$ and the limited current-request signal $I_{baseIn}$. In some embodiments, the limited current-request signal $I_{baseIn*}$ corresponds to a version of the current-request signal $I_{baseIn}$ that is less than about an upper bound signal $I_{baseBound}$, for example, generated by the current limiter 1020. The base current controller 1016 will be described in greater detail in connection with FIG. 13.

The DC bus controller 1018 is configured to receive the phase control signal θ and a reference phase $θ_R$ as inputs and is further configured to generate the commanded bias signal $V_{DC,CMD}$ as an output. In the illustrated embodiment, the DC bus controller 1018 can provide the commanded bias signal $V_{DC,CMD}$ to the BCU PFC block 1008 and can receive the phase control signal θ from the base current controller 1016. The DC bus controller 1018 can generate the commanded bias signal $V_{DC,CMD}$ based on a comparison of the phase control signal θ and the reference phase. The DC bus controller 1018 will be described in greater detail in connection with FIG. 14.

The current limiter 1020 can be configured to receive an AC reference signal AC Ref and a measurement $y_{ac}$ of the power current $I_{ac}$ provided to the BCU PFC block 1008. The current limiter 1020 can be further configured to generate the upper bound signal $I_{baseBound}$ based on a comparison of the AC reference signal with the measurement signal $y_{ac}$. The AC reference signal AC Ref can be an exogenous signal that represents a power current to bias towards (e.g., prefer). The current limiter 1020 will be described in greater detail later with reference to FIG. 15.

Now turning to the power receiver system 1004 of FIG. 10, the vehicle pad can be configured to couple to the wireless field generated by the base pad 1012, and configured to generate the current $I_{secondary}$ based on the wireless field. The secondary pad 1022 can correspond to, for example, the electric vehicle induction coil 116 of FIG. 1. The current $I_{secondary}$ can be provided to the tuning/rectifier 1024 and output filter 1026 blocks for generating an output current $I_{OUT}$. The tuning/rectifier 1024 block can include circuitry configured to vary the impedance at the secondary pad 1022 to vary the coupling between the base pad 1012 and the secondary pad 1022. The tuning/rectifier 1024 block can include circuitry configured to convert and/or regulate the current $I_{secondary}$. The output filter 1026 can include circuitry for filtering the rectified current $I_{secondary}$ into a signal suitable for charging and/or powering the host device 1028.

The host device 1028 can be configured to receive an output current for charging or powering the host device 1028. Examples of variants of the host device 1028 include electric vehicles and/or consumer electronic devices. The host device 1028 can provide other components of the power receiver system 1004 various charging parameters, such as maximum current, maximum voltage, maximum power, and the like characteristics. In the illustrated embodiment, the host device 1028 provides these parameters to the charge curve control block 1030.

The charge curve control block 1030 can be configured to generate the reference output current $I_{outIn}$. The reference output current $I_{outIn}$ can correspond to a desired output current that would achieve effect wireless power transfer based on the bias level $V_{SC,DC}$ of the output filter 1026 and various parameters of the host device 1028 such as maximum allowable current, voltage, power, and the like. The reference output current $I_{outIn}$ can be selected based on efficiency considerations. For example, given a bias level $V_{SC,DC}$ of the output filter 1026, an output current $I_{out}$ can be selected that improves efficiency of power transmission as well as secondary considerations, such as voltage and/or power levels. Maintaining operating parameters of the output such as, e.g., output voltage, output power, to be within predetermined ranges compatible with effective use of the current can increase power transfer effectiveness and/or efficiency. For example, when charging a battery using the output of the power receiver, the operating parameters can be selected to match a "battery charge curve" corresponding to effective charging of the battery.

The secondary current controller 1032 can be configured to receive the reference output current $I_{outIn}$ and a measurement $y_{out}$ of the output current $I_{out}$, and can be configured to generate the current-request signal $I_{baseIn}$. For example, the current-request signal $I_{baseIn}$ can correspond to a normalized or relative level of current that the power receiver system 1004 is commanding the power transfer system to conduct through the base pad 1012. As stated, the normalized relative level can be with respect to a predetermined value, such as a maximum transmit antenna current $I_{base}$. In one embodiment, the secondary current controller 1032 can be configured to adjust the current-request signal $I_{baseIn}$ in way that drives the output current towards the reference output current $I_{outIn}$. The secondary current controller 1032 can be configured to provide the current-request signal $I_{baseIn}$ to the communication antenna (for example, a Bluetooth antenna 1036) to transmit the current-request signal $I_{baseIn}$ to the power transmitter system 1002. The secondary current controller 1032 will be described in greater detail later in connection with FIG. 11.

The secondary configuration controller 1034 can be configured to receive the reference output current $I_{outIn}$, an estimate $\hat{I}_{sc}$ of the secondary pad 1022 current $I_{secondary}$ (for example, an estimate of the short circuit current of the secondary coil according to equation), and a measurement $y_{base}$ of the transmit antenna current $I_{base}$. In one embodiment, the estimate $\hat{I}_{sc}$ an correspond to the short circuit current $I_{2sc}$ described above in connection with FIGS. 6 and 7. It will be appreciated that the secondary configuration controller 1034 can receive an estimate of the open voltage $\hat{V}_{OC}$ of the secondary coil in addition, or in alternative, to the estimate $\hat{I}_{sc}$.

The secondary configuration controller 1034 can be further configured to generate the configuration control signal Ds as an output based on at least the received input signals. The configuration control signal Ds can be used to adjust various parameters of the tuning rectifier block, output filter 1026, and/or the secondary pad 1022. For non-limiting examples, the secondary configuration controller 1034 can adjust the coil ratio, the number of active coils, and/or the current drawn from the secondary pad 1022 of the power receiver system 1004. The secondary configuration controller 1034 will be described in greater detail in connection with FIG. 12.

Figure 11:
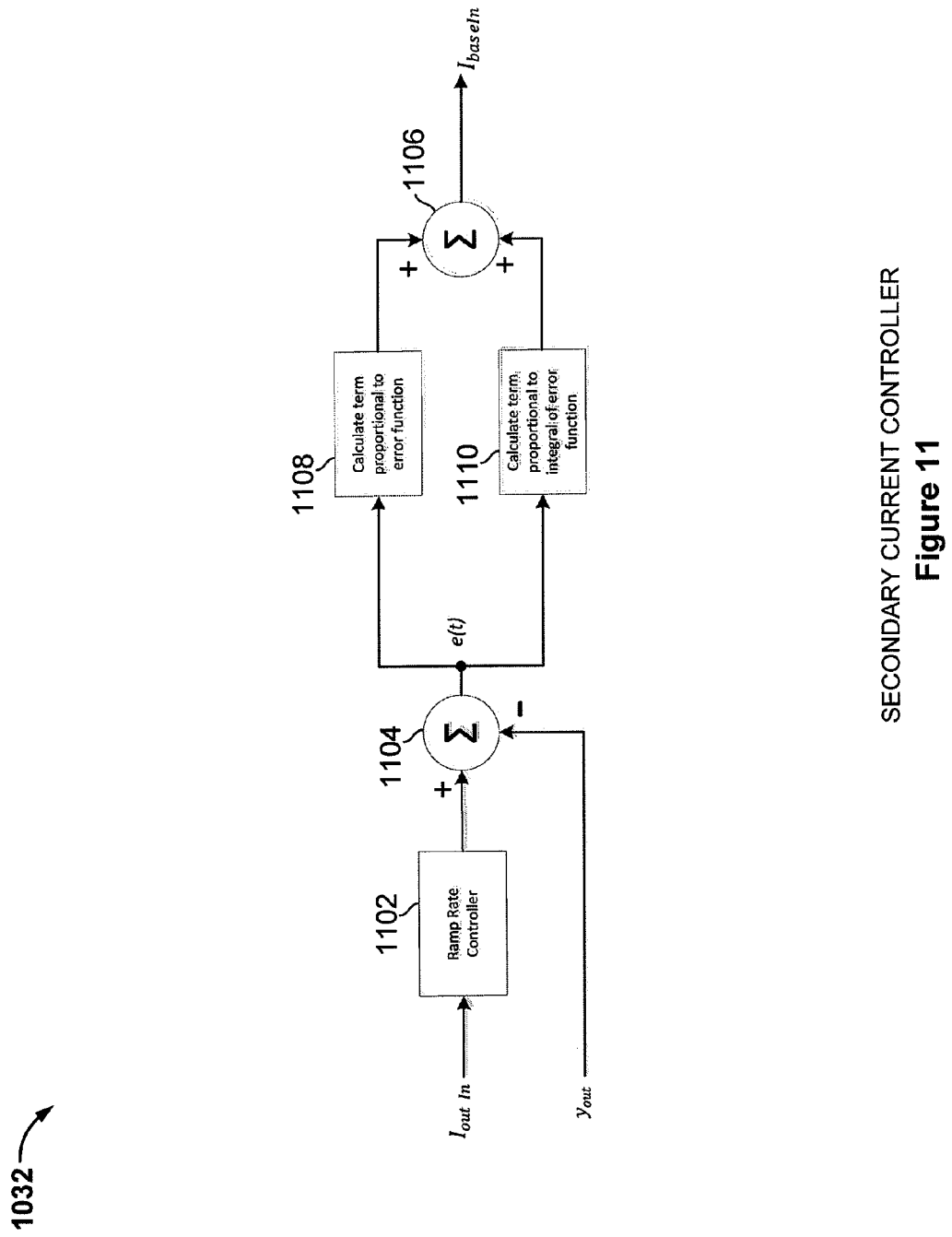
FIG. 11 shows a state diagram of a secondary current controller of the power receiver system of FIG. 10 in accordance with an exemplary implementation.

FIG. 11 shows a state diagram of a secondary current controller 1032 of the power receiver system 1004 of FIG. 10 in accordance with an exemplary implementation. The illustrated secondary current controller 1032 comprises an optional ramp rate controller 1102, first and second summation junctions 1104, 1106, a proportional gain 1110, and an integral gain 1112. The optional ramp rate controller 1102 can be configured to limit or fix a rate of change of the reference output current $I_{outIn}$. Limiting the rate of change can aid in preventing or inhibiting oscillations caused by integral wind-up and rapid increases in the integral gain term due to rapid changes in the reference output current $I_{outIn}$. Limiting the rate of change can also aid in reducing high-frequency components in the current-request signal $I_{baseIn}$ that could otherwise cause instabilities. For example, time delays in the system can cause oscillations or even instabilities if the secondary current controller drives the base current $I_{base}$ at a high frequency relative to the time delay (for example, at a frequency greater than about 1/τ Hz, where τ represents the time delay in seconds). Rate limiting the reference output current $I_{outIn}$ can limit the overall bandwidth of the secondary current controller 1034. Accordingly, the optional ramp rate controller 1102 can improve robustness and stability.

The reference output current $I_{outIn}$, or optionally the output of the ramp rate controller 1102, can be compared with the measurement signal $y_{out}$ by the first summing junction 1104 to generate an error signal e. The current-request signal $I_{baseIn}$ is generated by combining a term proportional to the error signal e and a term proportional to an integral of the error signal e. The term proportional to the error signal e can improve the bandwidth of the secondary current controller 1032, which can improve the speed of response. The "integral action" of the term proportional to integral the error signal e can aid in reducing steady-state error and compensating for unknown current levels at the power transmitter system 1002.

In one embodiment, the secondary current controller 1032 has a bandwidth of about 250 Hz. Other bandwidths may be selected based on specific application considerations, such as speed of response, robustness to communication delays, other non-minimum phase dynamics, and model uncertainty. For example, in one embodiment, the secondary current controller 1032 has a bandwidth (in Hertz) less than about 1/τ, where τ represents the time delay (in seconds) associated with communicating a current request signal $I_{baseIn}$ and power transmitter system 1002 taking action in response to the current request signal $I_{baseIn}$. In another embodiment, the secondary current controller 1032 has a bandwidth less than about $1/(2\tau)$. In another embodiment, the secondary current controller 1032 has a bandwidth less than about $1/(16\tau)$. Selecting the bandwidth less than about $1/(16\tau)$ can provide a phase margin greater than about 45 degrees.

Figure 12:
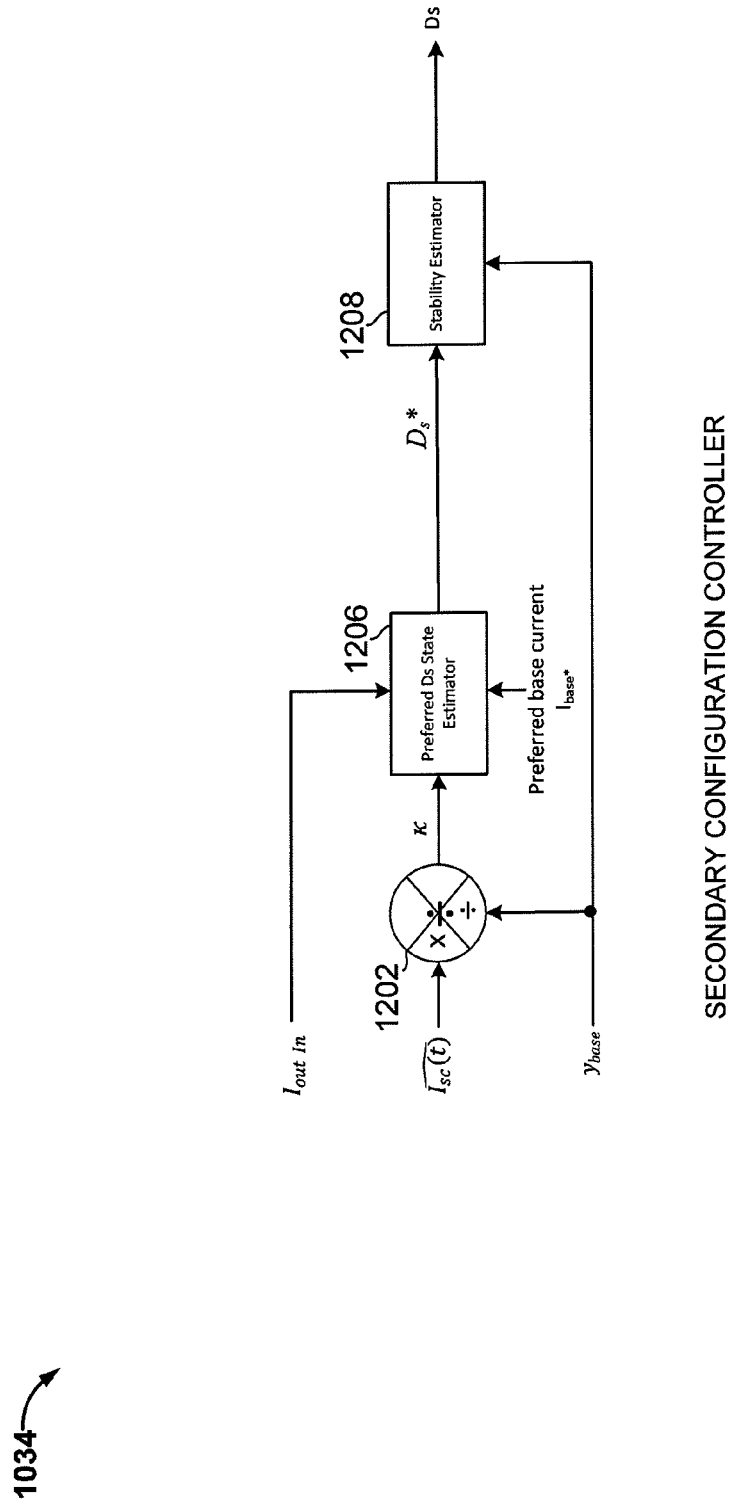
FIG. 12 shows a state diagram of a secondary configuration controller of the power receiver system of FIG. 10 in accordance with an exemplary implementation.

FIG. 12 shows a state diagram of a secondary configuration controller 1034 of the power receiver system 1004 of FIG. 10 in accordance with an exemplary implementation. While some elements of FIG. 12 are labeled using the term "ideal" or "preferred" as used herein, the terms "ideal" and "preferred" are meant to signify that the "ideal" or "preferred" element is one of many elements which provides satisfactory operation of the IPT system, but that the operation in the "ideal" or "preferred" element is better in some way than in some other elements. Use of the term "ideal" and "preferred" in FIG. 12 does not imply that operation of the IPT system or the power receiver is necessarily optimized or maximized with the selected element, but in certain embodiments, the element may be selected to achieve high-level, optimized, or maximized operation of the IPT system or the power receiver (e.g., charging of the battery).

The secondary configuration controller 1034 includes a division block 1202, a state estimator 1206, and a stability estimator 1208. Using the division block 1202, the secondary configuration controller 1034 can be configured to divide the estimated secondary current $\hat{I}_{SC}$ by the measurement $y_{base}$ of the transmit antenna current $I_{base}$ to generate an estimated coupling coefficient κ. The state estimator 1206 can be configured to receive the estimated coupling coefficient κ, the reference output current $I_{outIn}$, and a signal $I_{base*}$ indicative of a preferred base pad current $I_{base}$ as inputs and to generate a preferred configuration signal $D_{s*}$ as an output. In one embodiment, the signal $I_{base*}$ can be provided by the power transmitter system 1002, for example, during initialization and/or during power transfer. However, it will be appreciated that the signal $I_{base*}$ can be provided by any applicable source, including a component of power receiver system 1004, such as a memory device (not shown). In one aspect, the power receiver system 1004 biases the generation of the current request signal $I_{baseIn}$ and the generation of the configuration control signal Ds towards achieving a base pad current $I_{base}$ that is approximately the preferred base pad current $I_{base*}$, if feasible. Due to constraints at the power transmitter system 1002, however, achieving the current $I_{base*}$ does not always occur. For example, the current limiter block 1020 of the power transmitter system 1002 may inhibit base pad currents $I_{base}$ above a certain bound.

As stated, the state estimator 1206 is configured to generate the preferred configuration signal $D_{s*}$. The signal $D_{s*}$ can be used to indicate a preferred selection of one or more parameters of the secondary pad 1022 and/or characteristics of the coupling between the base pad 1012 and the secondary pad 1022. For example, the signal $D_{s*}$ can correspond to a preferred number of coils of the secondary pad 1022 to be activated/deactivated, the amount of current to be drawn from the charging pad 1022, and the like characteristics related to performance of the wireless power transfer. These characteristics can affect the loading at the power transmitter system 1002, and therefore can affect the efficiency of the power transmitter 1002. The preferred configuration signal $D_{s*}$ parameters can be selected based at least on the reference output current $I_{outIn}$, the estimated coupling coefficient κ, and the preferred base current $I_{base*}$.

The stability estimator 1208 is configured to receive the preferred configuration signal $D_{s*}$ and the measurement signal $y_{base}$ as inputs and to generate the configuration signal Ds as an output to adjust the operation of the wireless power receiver 1004. Thus, the configuration signal Ds can adjust a characteristic of the coupling (e.g., the coupling efficiency, the load seen at the transmitter 1002, and the like) between the receive antenna and the transmit antenna based at least partly on the measurement signal $y_{base}$. In turn, the configuration signal Ds can adjust an efficiency of the power transmitter 1002 based at least partly on a comparison of the current request signal $I_{baseIn}$ and the base pad measurement signal $y_{base}$, as described in greater detail below.

The state estimator 1206 and the stability estimator 1208 can be configured to adjust operating points of the power receiver system 1004 to achieve efficient operation (for example, by requesting a base current $I_{base}$ equal to approximately the preferred base current $I_{base*}$) while protecting the operation of the wireless power transmitter and receiver systems 1002, 1004. For example, if the measurement $y_{base}$ does not match the current request $I_{baseIn}$, or if it is estimated that base pad current $I_{base}$ is unable to achieve $I_{baseIn}$, then the stability estimator 1208 can prevent the secondary configuration controller 1034 from changing the operating point of the power receiver system 1004 in a way that would otherwise overload or damage the power transmitter system 1002.

The secondary current controller 1032 and/or the secondary configuration controller 1034 can be configured to adjust an efficiency of the power transmitter 1002 based at least partly on a comparison of the current request signal $I_{baseIn}$ and the base pad measurement signal $y_{base}$. In one embodiment, if the inferred or requested current $I_{base}$ (for example, indicated by $y_{base}$) is close to the maximum, then the stability estimator 1208 will try to increase the amount of output current $I_{out}$ the receiver 1004 can produce by increasing the number of coils that are activated and/or increasing the proportion of current $I_{secondary}$ generated by them. If the base current $I_{base}$ is less than a level, then the stability estimator 1208 is configured to reduce the coupling between the base pad 1012 and the secondary pad 1022 by, for example, turning off coils or reducing the amount of current drawn out of the coils. If the measurement $y_{base}$ indicates that the base pad current $I_{base}$ is approximately the preferred current $I_{base*}$, and the state estimator 1206 does not determine a more preferred configuration, then the stability estimator 1208 will not adjust the configuration signal Ds.

If the power transmitter system 1002 reduces power, the power receiver system 1004 should maintain stability because, in that case, the transmitter 1002 should not increase the base pad current $I_{base}$ and the power receiver system 1004 should not increase the coupling because the current $I_{base}$ will be lower than requested and should be lower than ideal base current $I_{base*}$.

In one embodiment, the configuration control signal Ds can be generated by estimating a number of output currents $I_{out}$ that would result from the current preferred base current $I_{base*}$ and the current estimated coupling coefficient κ for a number of different configuration states Ds. Accordingly, a configuration can be selected by choosing the configuration that would provide the estimated output current $I_{out}$ closest to the reference current $I_{outIn}$. In one embodiment, a look-up table can be used to select the configuration signal Ds based at least on the preferred base current $I_{base*}$ and the estimated coupling coefficient κ.

Figure 13:
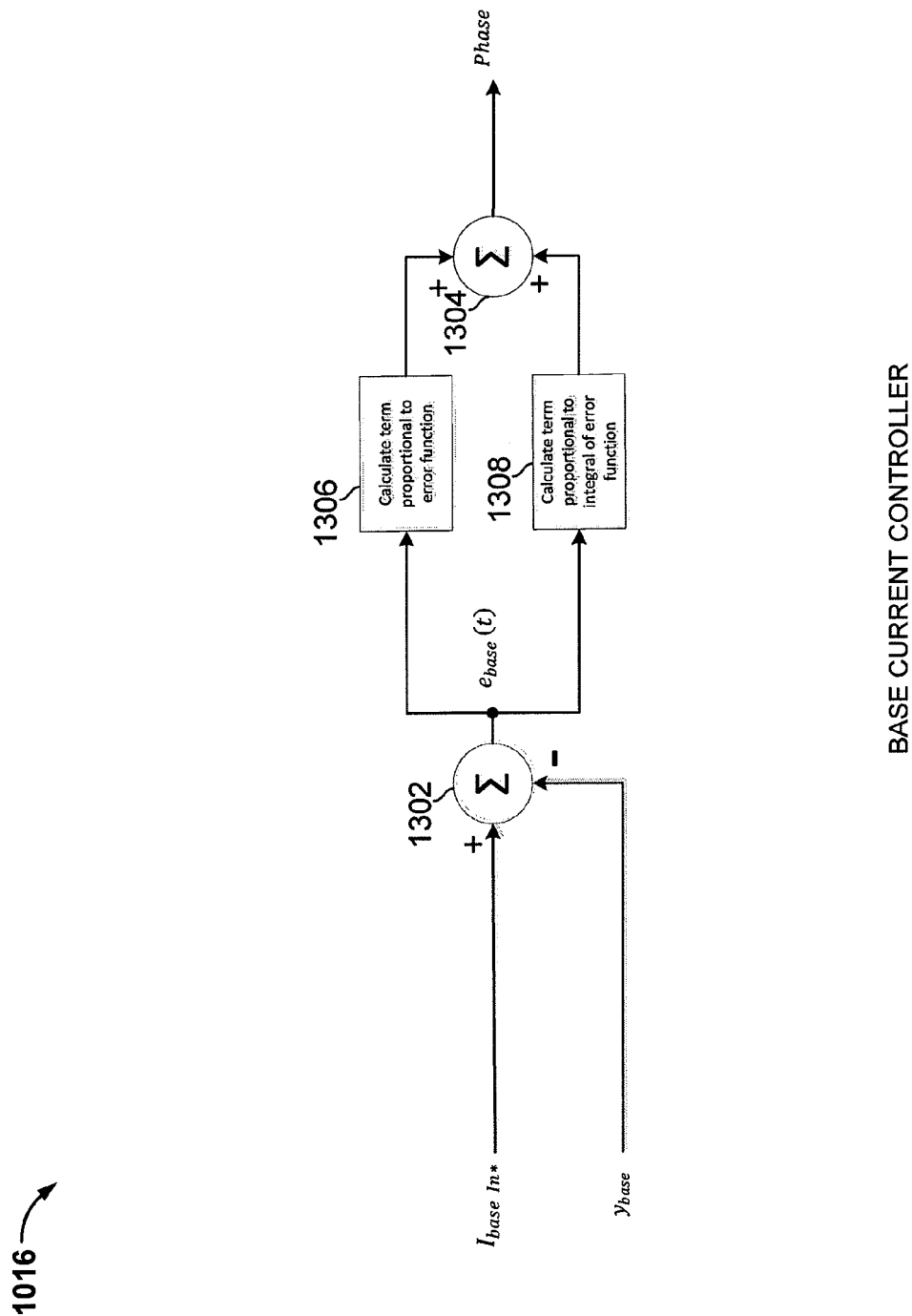
FIG. 13 shows a state diagram of a base current controller of the power transmitter system of FIG. 10 in accordance with an exemplary implementation.

FIG. 13 shows a state diagram of a base current controller 1016 of the power transmitter system 1002 of FIG. 10 in accordance with an exemplary implementation. The illustrated base current controller 1016 comprises first and second summation junctions 1302, 1304, a proportional gain

1306, and an integral gain 1308. The current-request signal $I_{baseIn}$ is compared with the measurement signal $y_{base}$ by using the first summing junction 1302. The first summing junction 1302 generates an error signal $e_{base}(t)$. The phase control signal θ is generated by combining a term proportional to the error signal and a term proportional to an integral of the error signal. For example, the proportional gain 1306 receives the error signal $e_{base}(t)$ as an input and generates the term proportional to the error as an output. The integral gain 1308 receives the error signal $e_{base}(t)$ as an input and generates the term proportional to an integration of the error signal. The two terms can be combined by the second summing junction 1304. The term proportional to the error signal can improve the bandwidth of the base current controller 1016 for improving the speed of response. The term proportional to integral the error signal can aid in reducing steady-state error.

In one embodiment, the base current controller 1016 has a bandwidth of about 250 Hz. Other bandwidths may be selected based on specific application considerations, such as speed of response, robustness to communication delays and other non-minimum phase dynamics and to model uncertainty, and time-scale separation with the power receiver system 1004. For example, in one embodiment, the base current controller 1016 has a bandwidth greater than about the bandwidth of the secondary current controller 1032. In another embodiment, the base current controller 1016 has a bandwidth greater than about twice the bandwidth of the secondary current controller 1032. In another embodiment, the base current controller 1016 has a bandwidth greater than about ten times the bandwidth of the secondary current controller 1032.

FIG. 14 shows a state diagram of a DC bus controller 1018 of the power transmitter system 1002 of FIG. 10 in accordance with an exemplary implementation. The illustrated DC bus controller 1018 comprises a summation junction 1402 and an integral gain 1404. The DC bus controller 1018 is configured to compare the phase control signal θ with a reference phase signal $θ_R$ using the summation junction 1402. The reference phase signal $θ_R$ can correspond to a phase of the BCU inverter 1010 that provides a benefit (such as, efficiency) over other phase angles of the BCU inverter 1010. In one embodiment, the reference phase signal $θ_R$ is about 130 degree. The integral gain 1404 is configured to generate the bias $V_{DC}$ based on a proportional gain of an integration of the error signal $e_{phase}$. The DC bus control signal $V_{DC}$ is provided to the BCU inverter 1010 for directly biasing, or controlling the biasing of, the BCU inverter 1010. The term proportional to integral the error signal can aid in reducing steady-state error between the phase control signal θ and the reference phase signal $θ_R$ and preventing the duty cycle from reaching a damaging condition. In one embodiment, the DC bus controller 1018 has a bandwidth of about 20 Hz. Other bandwidths may be selected based on specific application considerations, such as time-scale separation with the base current controller 1016, as well as stability and robustness considerations. For example, the DC bus controller 1018 can have a bandwidth that is less than about the bandwidth of the base current controller 1016 divided by ten. Additionally or alternatively, the DC bus controller 1018 can have a bandwidth that is greater than about the bandwidth of the secondary current controller 1032.

FIG. 15 shows a state diagram of a current limiter 1020 of the power transmitter system 1002 of FIG. 10 in accordance with an exemplary implementation. The illustrated current limiter 1020 comprises first and second summation junctions 1502, 1504, a proportional gain 1506, and an integral gain 1508. The current limiter 1020 is configured to compare the measurement $y_{ac}$ with the AC reference signal AC Ref using the first summing junction 1302. The AC reference AC Ref signal can be related to a maximum allowable AC current that should be drawn from the infrastructure 1006 of FIG. 10. Accordingly, the first summing junction 1502 can be configured to generate an error signal $e_{ac}$. The proportional gain 1506 is configured to generate a term proportional to the error signal $e_{ac}$. The integral gain 1508 is configured to generate a term proportional to an integration of the error signal $e_{ac}$. Based on the proportional gain and the integral gain, the second summing junction 1504 is configured to combine these two terms to generate the upper bound signal $I_{baseBound}$. The upper bound signal $I_{baseBound}$ can aid in protecting the base pad 1012 of FIG. 10 from damage caused by over stressing the antenna with current generated in response to the current-request signal $I_{baseIn}$.

Figure 16:
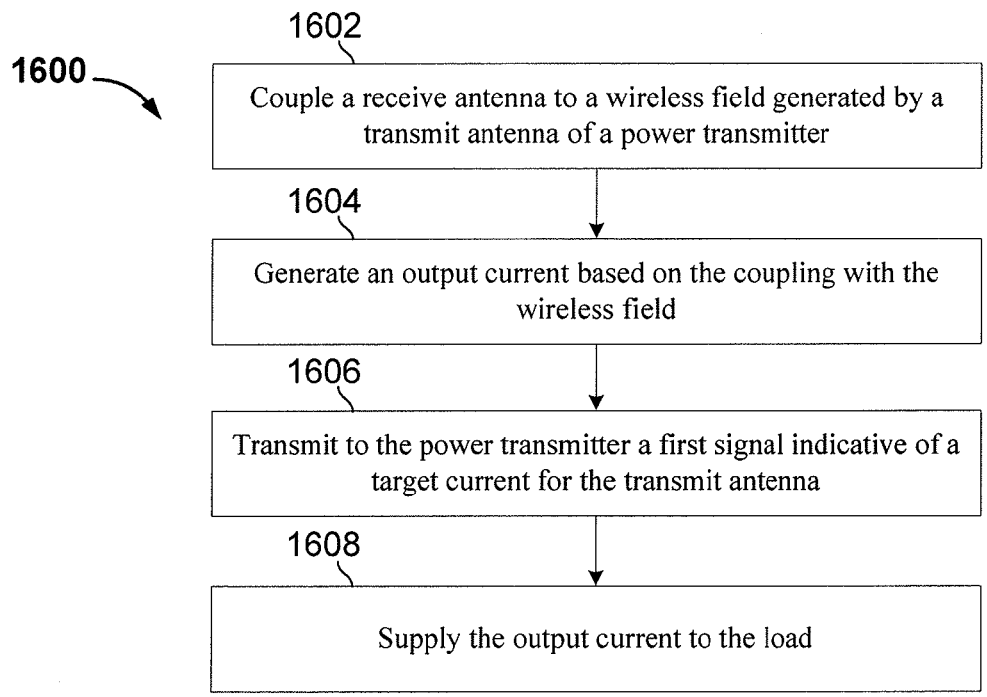
FIG. 16 shows a flow chart of a method for receiving wireless power and charging a load in accordance with an exemplary implementation.

FIG. 16 shows a flow chart of a method 1600 for receiving wireless power and charging a load in accordance with an exemplary implementation. The method 1600 can start at block 1602 for coupling a receive antenna to a wireless field generated by a transmit antenna of a power transmitter. For example, the receive antenna can correspond to a receive antenna of the secondary pad 1022 of the power receiver system 1004 of FIG. 10. Furthermore, the wireless field can be generated by, for example, the base pad 1012 of FIG. 10. After coupling the receive antenna to the wireless field, the method 1600 can proceed to block 1604 for generating an output current based on the coupling with the wireless field. For example, the output current can be generated by the secondary pad 1022, as well as the tuning/rectifier 1024 and the output filter 1026 to generate the output current $I_{out}$ as shown in FIG. 10.

Before, during, or after coupling the receive antenna with the wireless field, the method 1600 can move to block 1606 for transmitting to the power transmitter a first signal indicative of a target current for the transmit antenna. For example, the first signal can correspond to a request for the power transmitter to conduct a normalized current through the base pad. In the embodiment of FIG. 10, the power receiver system 1004 can be configured to transmit the current-request signal $I_{baseIn}$ via the Bluetooth antenna 1036. The method can continue to block 1608, supplying the output current to the load. In one aspect of various embodiments, the first signal can be used to control the amount of current flowing through the base pad and, in turn, the output current generated at the power receiver system.

Figure 17:
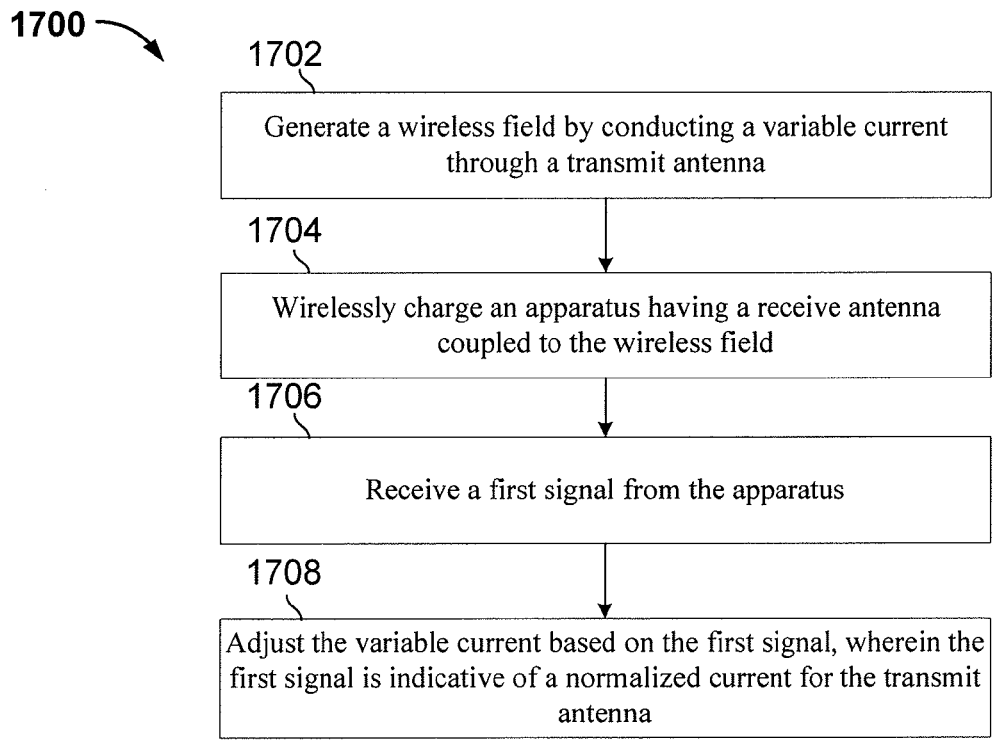
FIG. 17 shows a flow chart of a method for transmitting wireless power and charging a load in accordance with an exemplary implementation.

FIG. 17 shows a flow chart of a method 1700 for transmitting wireless power and charging a load in accordance with an exemplary implementation. The method 1700 can start at block 1702 for generating a wireless field by conducting a variable current through a transmit antenna. For example, the wireless field can be generated by, for example, the base pad 1012 of FIG. 10. The variable current can be varied by selection of the phase control signal θ and/or the bias $V_{DC}$ to the BCU inverter 1010. After generating the wireless field, the method 1700 can proceed to block 1704 for wirelessly charging an apparatus having a receive antenna coupled with the wireless field, generating an output current based on the coupling with the wireless field. For example, the receive antenna can correspond to a receive antenna of the secondary pad 1022 of FIG. 10. Before, during, or after coupling the receive antenna to the wireless field, the method 1700 can move to block 1706 for receiving a first signal from the apparatus. For example, the first signal can correspond to a request for the power transmitter to conduct a normalized current through the base pad. In the embodiment of FIG. 10, the power transmitter system 1002 can be configured to receive the current-request signal $I_{baseIn}$ via the Bluetooth antenna 1014. After receiving the first signal, the method can continue to block 1708 for adjusting the variable current based on the first signal, wherein the first signal is indicative of a normalized current for the transmit antenna.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a power receiver configured to supply current to a load and to be wirelessly operatively coupled to a power transmitter can comprise means for coupling to the wireless field and for generating the output current based on the coupling with the wireless field (e.g., a secondary pad 1022 and optionally one or more of a tuning/rectifier 1024 or an output filter 1026 of FIG. 10). The power receiver can further comprise means for generating and transmitting to the power transmitter a first signal indicative of a target current for the transmit antenna (e.g., the secondary current controller and optionally one or more of the charge curve control 1030 or a communication antenna such as the Bluetooth antenna 1036). For another example, a power transmitter configured to generate a wireless field and to charge an apparatus coupled to the wireless field can comprise means for generating the wireless field by conducting a variable current through a transmit antenna (e.g., a base pad 1012 and optionally one or more of an infrastructure 1006 or a BCU inverter 1010 of FIG. 10). The power transmitter can further comprise means for receiving a first signal and adjusting the variable current based on the first signal, wherein the first signal is indicative of a normalized current (e.g., the base controller 1016 and optionally one or more of the a communication antenna such as the Bluetooth device 1014, the decision block 1015, the base current controller 1016, the DC bus controller 1018, or the current limiter 1020).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for receiving charging power wirelessly from a charging transmitter having a transmit coil, the apparatus comprising:
 a receiver communication circuit coupled to a receive coil and to a load, configured to receive an indication of a value of at least one characteristic of the charging transmitter;
 a sensor circuit configured to measure a value of a short circuit current or an open circuit voltage of the receive coil; and
 a controller configured to:
  compare the value of the short circuit current or the open circuit voltage to a threshold charging parameter, the threshold set at a level that provides charging power sufficient to charge the load; and
  initiate receiving the charging power from the charging transmitter based on the short circuit current or the open circuit voltage of the receive coil being greater than or equal to the threshold charging parameter.

2. The apparatus of claim 1, wherein the threshold charging parameter comprises at least one of a charging current and a charging voltage.

3. The apparatus of claim 1, wherein the threshold charging parameter comprises a value of a charging current multiplied by a value of a maximum transmit coil current and divided by a value of a transmit coil current.

4. The apparatus of claim 1, wherein the sensor circuit is configured to measure the value of the short circuit current or the open circuit voltage induced by a transmit coil current passing through the transmit coil, the transmit coil current having a value that is less than a value of a maximum transmit coil current.

5. The apparatus of claim 1, wherein the indication comprises a value of a transmit coil current of the charging transmitter.

6. The apparatus of claim 5, wherein the indication further comprises a ratio of a value of a maximum transmit coil current to the value of the transmit coil current.

7. The apparatus of claim 5, wherein the controller is further configured to determine a coupling coefficient between the transmit coil and the receive coil based on the value of the transmit coil current and the value of the short circuit current or the open circuit voltage of the receive coil.

8. The apparatus of claim 1, wherein the receiver communication circuit is further configured to transmit an indication to refrain from initiating charging when the controller determines that the short circuit current or the open circuit voltage of the receive coil is less than the threshold charging parameter.

9. The apparatus of claim 1, further comprising a switching circuit configured to short circuit the receive coil or open circuit the receive coil.

10. The apparatus of claim 1, wherein the controller is further configured to determine an operating zone as a geometric area within which the short circuit current or the open circuit voltage of the receive coil is greater than or equal to the threshold charging parameter.

11. The apparatus of claim 1, wherein the controller is further configured to provide to a user interface an indication of compatibility between the receive coil and the charging transmitter when the short circuit current or the open circuit voltage of the receive coil is greater than or equal to the threshold charging parameter.

12. A method of receiving charging power wirelessly, the method comprising:
 receiving, by a receiver communication circuit, an indication of a value of at least one characteristic of a charging transmitter;
 measuring, by a sensor circuit, a value of an a short circuit current or an open circuit voltage of a receive coil;
 comparing, by a controller, the value of the short circuit current or the open circuit voltage to a threshold charging parameter, the threshold set at a level that provides charging power sufficient to charge a load; and
 initiating, by the controller, receiving the charging power from the charging transmitter based on the short circuit current or the open circuit voltage of the receive coil being greater than or equal to the threshold charging parameter.

13. The method of claim 12, wherein the threshold charging parameter comprises at least one of a charging current and a charging voltage.

14. The method of claim 12, wherein the threshold charging parameter comprises a value of a charging current multiplied by a value of a maximum transmit coil current and divided by a value of a transmit coil current.

15. The method of claim 12, wherein the short circuit current or the open circuit voltage is induced by a transmit coil current passing through a transmit coil, the transmit coil current having a value that is less than a value of a maximum transmit coil current.

16. The method of claim 12, wherein the indication comprises a ratio of a value of a maximum transmit coil current to the value of a transmit coil current.

17. The method of claim 16, wherein the indication further comprises a ratio of a value of a maximum transmit coil current to the value of the transmit coil current.

18. The method of claim 16, further comprising determining, by the controller, a coupling coefficient between the transmit coil and the receive coil based on the value of the transmit coil current and the value of the short circuit current or the open circuit voltage of the receive coil.

19. The method of claim 12, further comprising transmitting, by the receiver communication circuit, an indication to refrain from initiating charging when the short circuit current or the open circuit voltage of the receive coil is less than the threshold charging parameter.

20. The method of claim 12, further comprising short circuiting, by a switching circuit, the receive coil or open circuiting the receive coil.

21. The method of claim 12, further comprising determining by the controller, an operating zone as a geometric area within which the short circuit current or the open circuit voltage of the receive coil is greater than or equal to the threshold charging parameter.

22. An apparatus for receiving charging power wirelessly, the apparatus comprising:
 means for receiving an indication of a value of at least one characteristic of a charging transmitter, the means for receiving the indication being operatively connected to a load;
 means for measuring a value of a short circuit current or an open circuit voltage of the means for receiving the indication;
 means for comparing the value of the short circuit current or the open circuit voltage to a threshold charging parameter, the threshold set at a level that provides charging power sufficient to charge the load; and means for initiating receiving the charging power from the charging transmitter based on the short circuit current or the open circuit voltage of the means for receiving the indication being greater than or equal to the threshold charging parameter.

23. The apparatus of claim 22 further comprising means for transmitting an indication to refrain from initiating charging when the short circuit current or the open circuit voltage of the receive coil is less than the threshold charging parameter.

24. The apparatus of claim 22, wherein:
the means for receiving the indication comprises a receiver communication circuit;
the means for measuring a value of the short circuit current or the open circuit voltage comprises a sensor circuit; and
the means for comparing the value of the short circuit current or the open circuit voltage and the means for initiating receiving the charging power comprise a controller.

25. The apparatus of claim 22, wherein the threshold charging parameter comprises at least one of a charging current and a charging voltage.

26. The apparatus of claim 22, wherein the information comprises a ratio of a value of a maximum transmit coil current to a value of a transmit coil current.

27. An apparatus for transmitting charging power wirelessly to a receive coil of a receiver, the apparatus comprising:

a transmit circuit coupled to a transmit coil;
a sensor circuit coupled to the transmit circuit, the sensor circuit configured to measure a value of at least one characteristic of the transmit circuit; and
a communication circuit configured to transmit an indication of the value of the at least one characteristic of the transmit circuit to the receiver, the receiver receiving the indication causing the receiver to determine a threshold charging parameter based on the indication and causing the receiver to initiate receiving the charging power based on a short circuit current or an open circuit voltage of the receive coil being greater than or equal to the threshold charging parameter.

28. The apparatus of claim 27, wherein the at least one characteristic of the transmit circuit comprises a current of the transmit coil, the value of the current of the transmit coil being a percentage of a value of a maximum transmit coil current drivable through the transmit coil.

29. The apparatus of claim 28, wherein the communication circuit is further configured to transmit an indication of the percentage to the receiver.

30. The apparatus of claim 27, wherein:
the communication circuit is further configured to receive an indication from the receiver to initiate charging; and
the transmit circuit is further configured to initiate transmitting the charging power to the receive coil at a level sufficient to charge a load when the communication circuit receives the indication from the receiver to initiate charging.

* * * * *